United States Patent
Doneker et al.

(10) Patent No.: US 9,782,948 B2
(45) Date of Patent: Oct. 10, 2017

(54) ANTENNA APPARATUS AND METHOD FOR REDUCING BACKGROUND NOISE AND INCREASING RECEPTION SENSITIVITY

(71) Applicant: TANGITEK, LLC, Portland, OR (US)

(72) Inventors: Robert L. Doneker, Portland, OR (US); Kent G. R. Thompson, Portland, OR (US)

(73) Assignee: TANGITEK, LLC, Portland, OR (US)

( * ) Notice: Subject to any disclaimer, the term of this patent is extended or adjusted under 35 U.S.C. 154(b) by 484 days.

(21) Appl. No.: 14/243,251

(22) Filed: Apr. 2, 2014

(65) Prior Publication Data

US 2014/0213133 A1     Jul. 31, 2014

Related U.S. Application Data

(60) Division of application No. 13/431,746, filed on Mar. 27, 2012, now Pat. No. 8,854,275, which is a
(Continued)

(51) Int. Cl.
*H01Q 1/40*     (2006.01)
*B32B 5/08*     (2006.01)
(Continued)

(52) U.S. Cl.
CPC .............. *B32B 5/08* (2013.01); *B32B 5/26* (2013.01); *B32B 15/14* (2013.01); *H01Q 1/40* (2013.01);
(Continued)

(58) Field of Classification Search
CPC .............. B32B 15/14; B32B 2262/10; B32B 2307/202; B32B 5/08; B32B 5/26;
(Continued)

(56) References Cited

U.S. PATENT DOCUMENTS 3,193,712 A    7/1965   Harris
4,360,704 A    11/1982   Madry
(Continued)

FOREIGN PATENT DOCUMENTS

CN     201774688 U     3/2011
EP       0854536 A2     7/1998
(Continued)

OTHER PUBLICATIONS

European Patent Office, Extended European Search Report, EP application No. 12751876.9, Munich, Germany, 11 pages, Jul. 21, 2014.
(Continued)

*Primary Examiner* — Arti Singh-Pandey
(74) *Attorney, Agent, or Firm* — Marger Johnson

(57) ABSTRACT

An antenna apparatus includes an electrically conductive section having peripheral edges, an antenna element coupled to the electrically conductive section, which transmits or receives electromagnetic signals, and an electromagnetic absorbing carbon material component. The carbon material component is generally disposed adjacent to the electrically conductive section, and includes a border region extending beyond the peripheral edges of the electrically conductive section. The carbon material component can be constructed of a carbon fiber fabric in which the carbon fibers are arranged to increase the effective signal to noise ratio of the antenna apparatus and enhance antenna performance without increasing the baseline power consumption level. The carbon fibers can be coated with silicone to insulate them externally while enhancing their lengthwise conductivity.

14 Claims, 9 Drawing Sheets

Related U.S. Application Data continuation-in-part of application No. 13/039,981, filed on Mar. 3, 2011, now Pat. No. 8,164,527.

(51) Int. Cl.
  *H01Q 1/52* (2006.01)
  *H01Q 17/00* (2006.01)
  *B32B 5/26* (2006.01)
  *B32B 15/14* (2006.01)
  *H01Q 5/364* (2015.01)

(52) U.S. Cl.
  CPC .......... *H01Q 1/526* (2013.01); *H01Q 5/364* (2015.01); *H01Q 17/005* (2013.01); *B32B 2262/10* (2013.01); *B32B 2307/202* (2013.01); *Y10T 156/10* (2015.01); *Y10T 428/249921* (2015.04); *Y10T 442/3049* (2015.04); *Y10T 442/605* (2015.04)

(58) Field of Classification Search
  CPC ........ H01Q 17/005; H01Q 1/40; H01Q 1/526; H01Q 5/364; Y10T 156/10; Y10T 428/249921; Y10T 442/3049
  See application file for complete search history.

(56) References Cited

U.S. PATENT DOCUMENTS

| | | | |
|---|---|---|---|
| 4,388,623 A | 6/1983 | Crook et al. | |
| 4,684,020 A | 8/1987 | Ohlbach | |
| 4,703,134 A | 10/1987 | Uematsu | |
| 4,822,950 A | 4/1989 | Schmitt | |
| 4,986,372 A | 1/1991 | Ganssle | |
| 5,010,209 A | 4/1991 | Marciano-Agostinelli et al. | |
| 5,028,740 A | 7/1991 | Tomiya | |
| 5,043,538 A | 8/1991 | Hughey et al. | |
| 5,170,010 A | 12/1992 | Aldissi | |
| 5,171,938 A | 12/1992 | Katsumata et al. | |
| 5,236,736 A | 8/1993 | Kawakami et al. | |
| 5,300,733 A | 4/1994 | Uematsu | |
| 5,401,901 A | 3/1995 | Gerry et al. | |
| 5,486,648 A | 1/1996 | Chan et al. | |
| 5,493,070 A | 2/1996 | Habu | |
| 5,539,148 A | 7/1996 | Konishi et al. | |
| 6,104,357 A | 8/2000 | Brage | |
| 6,215,070 B1 | 4/2001 | King | |
| 6,274,066 B1 | 8/2001 | Easter | |
| 6,288,372 B1 | 9/2001 | Sandberg et al. | |
| 6,384,337 B1 | 5/2002 | Drum | |
| 6,503,364 B1 | 1/2003 | Masuda et al. | |
| 6,514,608 B1 | 2/2003 | Foulger | |
| 6,526,860 B2 | 3/2003 | Facciano et al. | |
| 6,697,248 B1 | 2/2004 | Luch | |
| 6,786,771 B2 | 9/2004 | Gailus | |
| 6,825,411 B2 | 11/2004 | Pommerenke et al. | |
| 6,828,501 B2 | 12/2004 | Eves et al. | |
| 6,897,826 B1 | 5/2005 | Kunz | |
| 6,979,709 B2 | 12/2005 | Smalley et al. | |
| 7,087,842 B2 | 8/2006 | Belli et al. | |
| 7,202,418 B2 | 4/2007 | Glew | |
| 7,276,664 B2 | 10/2007 | Gagnon | |
| 7,345,242 B2 | 3/2008 | Chen | |
| 7,449,631 B2 | 11/2008 | Lee et al. | |
| 7,459,627 B2 | 12/2008 | Lee et al. | |
| 7,491,883 B2 | 2/2009 | Lee et al. | |
| 7,688,274 B2 | 3/2010 | Gorrell et al. | |
| 7,738,942 B2 | 6/2010 | Weiner et al. | |
| 7,750,240 B2 | 7/2010 | Jiang et al. | |
| 7,939,167 B2 | 5/2011 | Kim et al. | |
| 8,324,515 B2 | 12/2012 | Stevenson et al. | |
| 8,583,259 B2 | 11/2013 | Liu et al. | |
| 2002/0189846 A1 | 12/2002 | Massey | |
| 2004/0020681 A1 | 2/2004 | Hjortstam et al. | |
| 2004/0154911 A1 | 8/2004 | Burgess et al. | |
| 2005/0001780 A1 | 1/2005 | Aisenbrey | |
| 2005/0011612 A1 | 1/2005 | Yakushiji et al. | |
| 2005/0045358 A1 | 3/2005 | Arnold | |
| 2005/0078050 A1 | 4/2005 | Aisenbrey | |
| 2006/0083948 A1 | 4/2006 | Kawaguchi et al. | |
| 2006/0237221 A1 | 10/2006 | Glew | |
| 2007/0068787 A1 | 3/2007 | Burgess et al. | |
| 2007/0089285 A1 | 4/2007 | Utecht et al. | |
| 2007/0116916 A1 | 5/2007 | Ito et al. | |
| 2007/0293086 A1 | 12/2007 | Liu et al. | |
| 2008/0018549 A1 | 1/2008 | Suzuki et al. | |
| 2008/0058467 A1 | 3/2008 | Takagi et al. | |
| 2008/0129638 A1 | 6/2008 | Ong | |
| 2008/0170982 A1* | 7/2008 | Zhang .................. B82Y 10/00 423/447.3 |
| 2009/0095523 A1 | 4/2009 | Stevenson et al. | |
| 2009/0104405 A1 | 4/2009 | Patten et al. | |
| 2009/0111325 A1 | 4/2009 | Ju | |
| 2009/0114420 A1 | 5/2009 | Winterhalter | |
| 2009/0120664 A1 | 5/2009 | Clark et al. | |
| 2009/0120681 A1 | 5/2009 | Matsuzaki | |
| 2009/0130995 A1 | 5/2009 | Wang Chen | |
| 2009/0159328 A1 | 6/2009 | Dai et al. | |
| 2009/0287426 A1 | 11/2009 | Kukowski | |
| 2009/0291608 A1 | 11/2009 | Choi et al. | |
| 2010/0000754 A1 | 1/2010 | Mann et al. | |
| 2010/0052992 A1 | 3/2010 | Okamura et al. | |
| 2010/0086729 A1 | 4/2010 | Long | |
| 2010/0096160 A1 | 4/2010 | Gareis et al. | |
| 2010/0159240 A1 | 6/2010 | Shah et al. | |
| 2010/0178487 A1 | 7/2010 | Arai et al. | |
| 2010/0188833 A1 | 7/2010 | Liang et al. | |
| 2010/0236812 A1 | 9/2010 | Laudenslager et al. | |
| 2010/0300744 A1 | 12/2010 | Romanko et al. | |
| 2011/0005808 A1 | 1/2011 | White et al. | |
| 2011/0062134 A1 | 3/2011 | Lochtman et al. | |
| 2011/0209909 A1 | 9/2011 | Doneker et al. | |
| 2011/0253441 A1 | 10/2011 | Doneker et al. | |
| 2011/0253475 A1 | 10/2011 | Doneker et al. | |
| 2011/0266023 A1 | 11/2011 | Doneker et al. | |
| 2011/0309845 A1 | 12/2011 | Kukowski | |
| 2014/0246228 A1* | 9/2014 | Doneker .............. H05K 9/0088 174/388 |

FOREIGN PATENT DOCUMENTS

| | | | |
|---|---|---|---|
| EP | 1191351 A2 | 3/2002 | |
| EP | 1447819 A1 * | 8/2004 | ............... H01B 1/22 |
| EP | 1447819 A1 | 8/2004 | |
| EP | 1612187 A1 | 1/2006 | |
| JP | 54139358 | 10/1979 | |
| JP | 55068703 | 5/1980 | |
| JP | 57166702 | 10/1982 | |
| JP | 58184805 | 10/1983 | |
| JP | 59061203 | 4/1984 | |
| JP | 60010806 | 1/1985 | |
| JP | 06-021683 | 1/1994 | |
| JP | 2004-095847 | 3/2004 | |
| JP | 2005012841 A | 1/2005 | |
| JP | 2005-285923 | 10/2005 | |
| JP | 2006-332260 | 12/2006 | |
| JP | 2009174956 | 8/2009 | |
| JP | 2010062571 | 3/2010 | |
| KR | 10-2011-0016661 | 2/2011 | |
| TW | 200929459 | 7/2009 | |
| TW | 200929725 | 7/2009 | |
| WO | 2005122331 A1 | 12/2005 | |
| WO | 2008012300 A1 | 1/2008 | |
| WO | 2010095925 A1 | 8/2010 | |

OTHER PUBLICATIONS

Park, Ki-Yeon, et al., Application for MWNT-added Glass Fabric/Epoxy Composites to Electromagnetic Wave Shielding Enclosure, Department of Aerospace Engineering, Korea Advanced institute of Science and Technology, Composite Structures, v 81, n 3, 401-6, 2007; ISSN: 0263-8223; DOI: 10.1016/j.compstruct.2006.08.029; Publisher: Elsevier Science Ltd., UK.

(56) References Cited

OTHER PUBLICATIONS

Liu et al., "Measurement on Dipole Antenna with Light Polarized Nano-Material (PNM) Textile Reflector," IEEE MTT-S Intl. Microwave Symposium Digest, 2009. Jun. 7-12, 2009, pp. 1069-1072.
Koch, et al., Patrick, "0.6-M Antennae for the Ambia Interferometer Array," Proceedings of the European Conference on Antennas and Propagation: EuCAP 2006 (ESA SP-626), Nov. 6-10, 2006, Nice, France, Editors: H. Lacoste & I. Ouwehand, published on CDROM, p. 668.1.

* cited by examiner

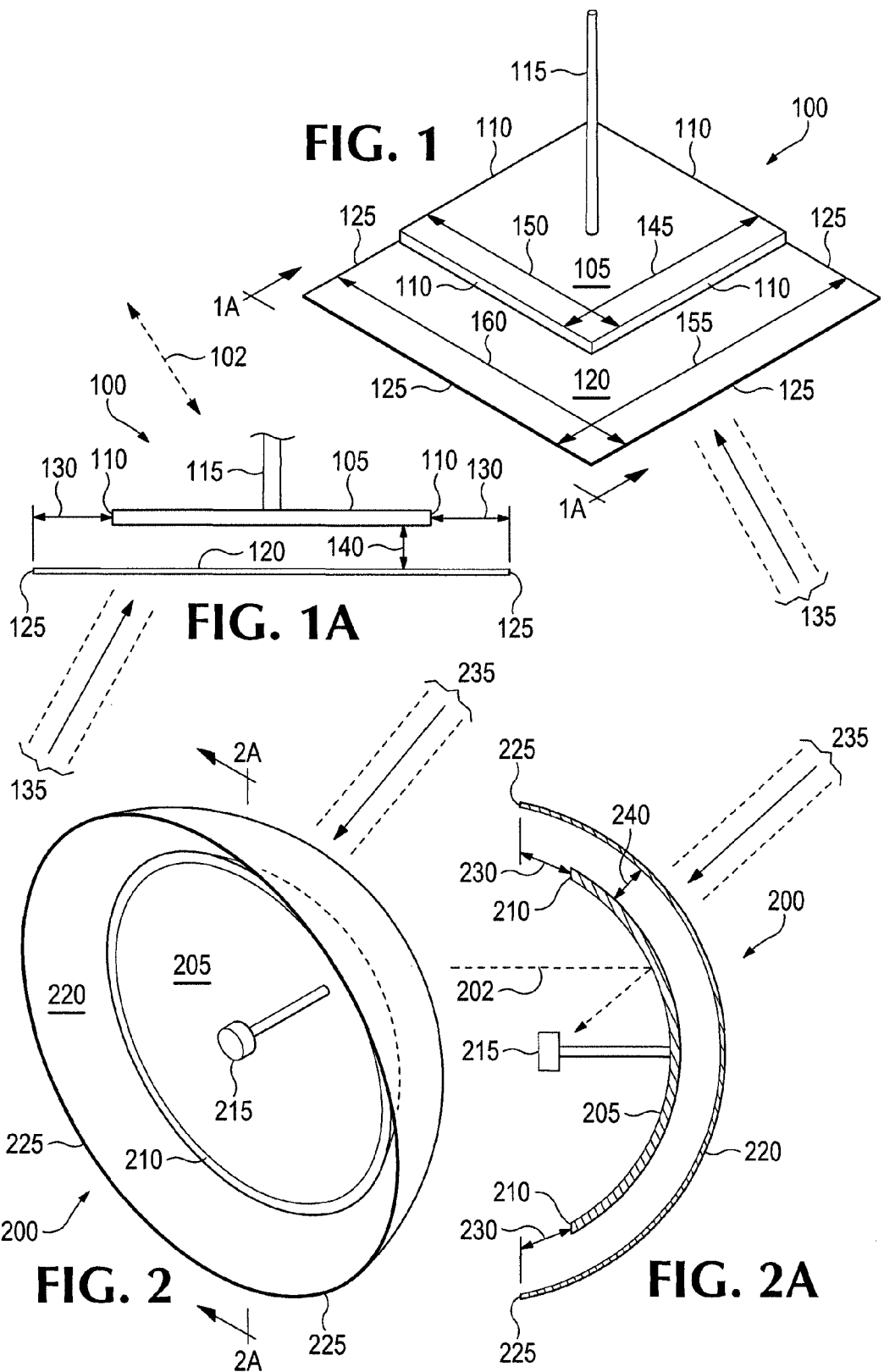

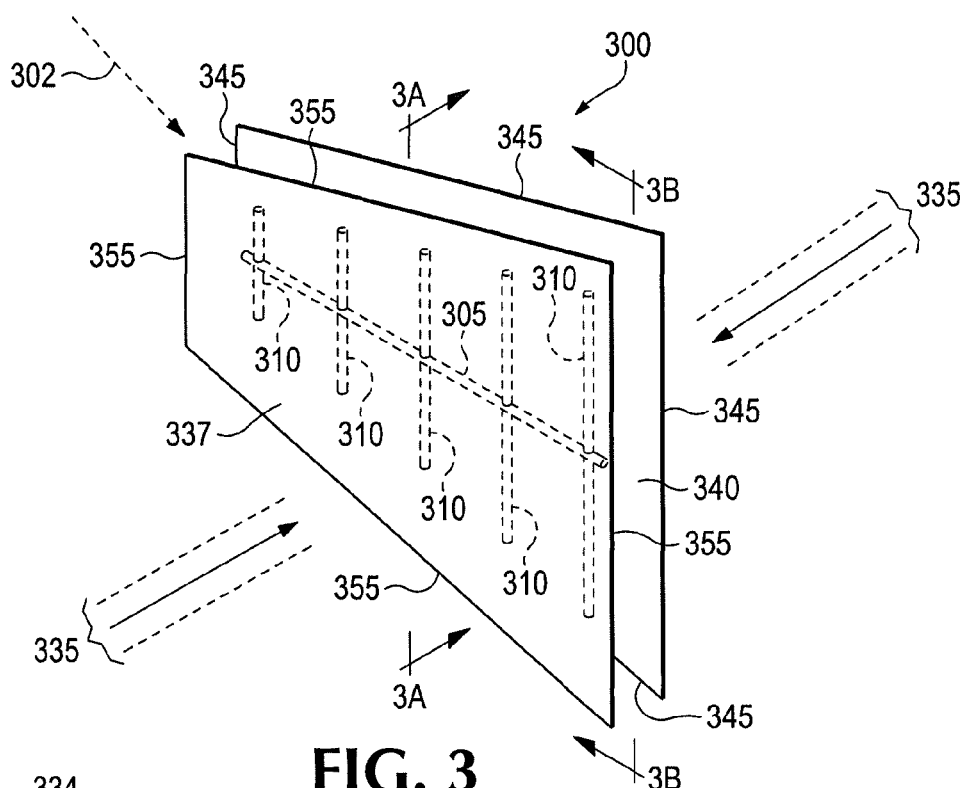
FIG. 3
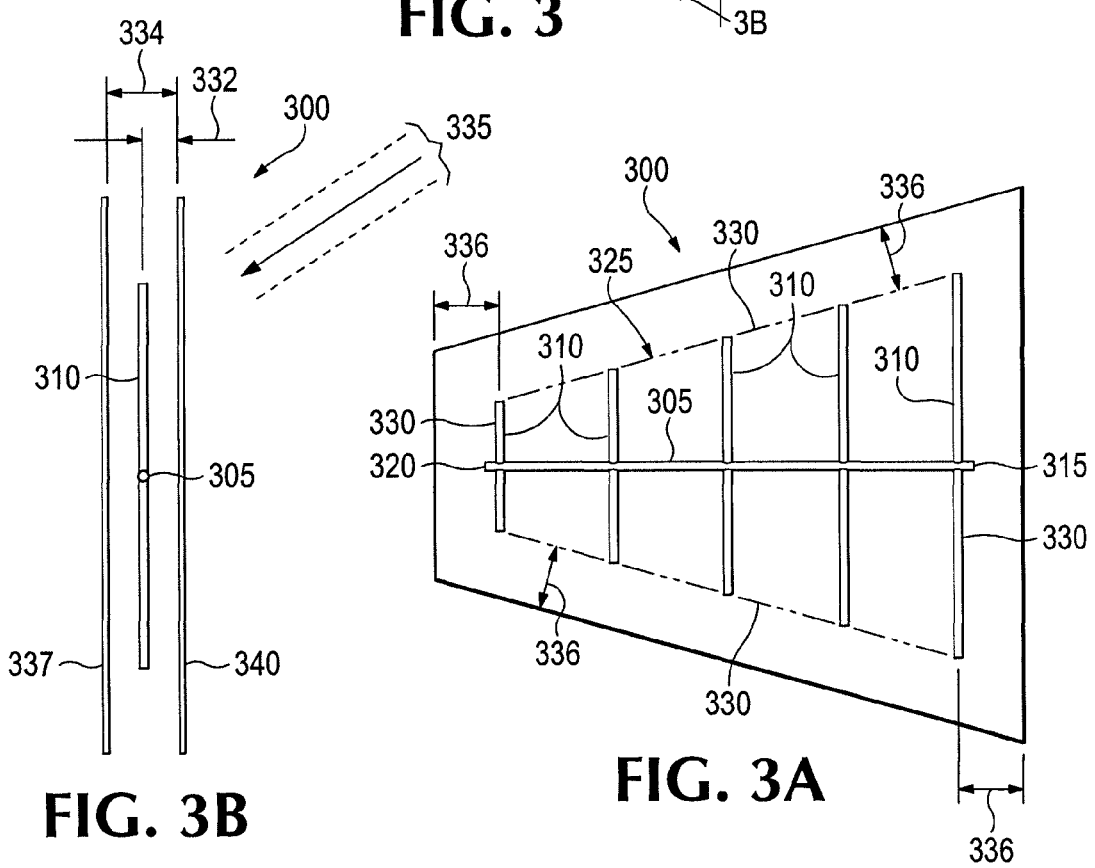
FIG. 3B
FIG. 3A

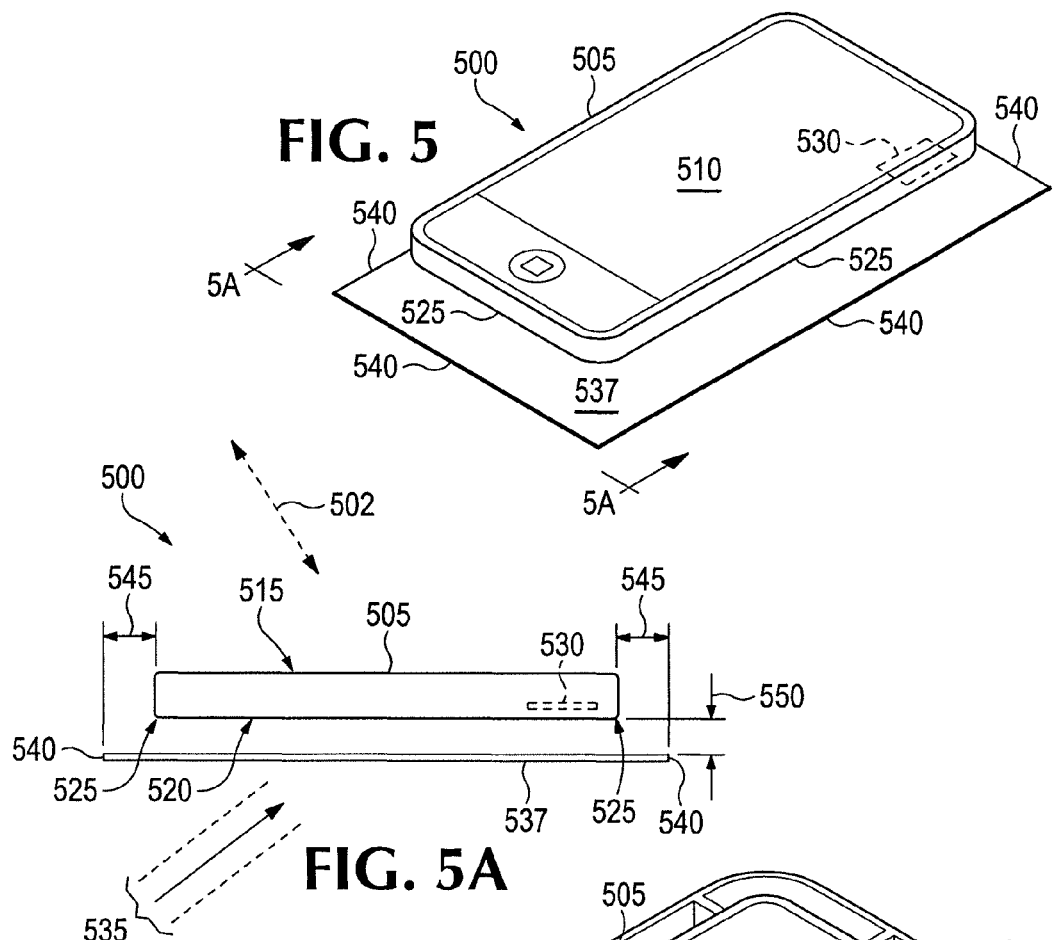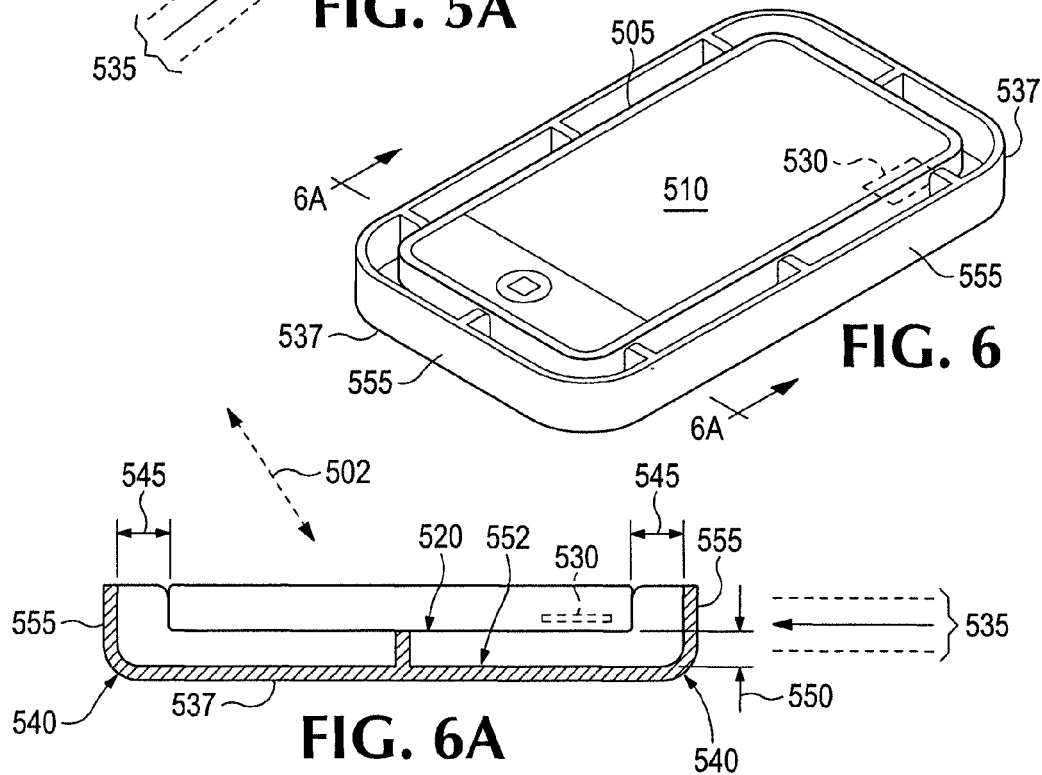

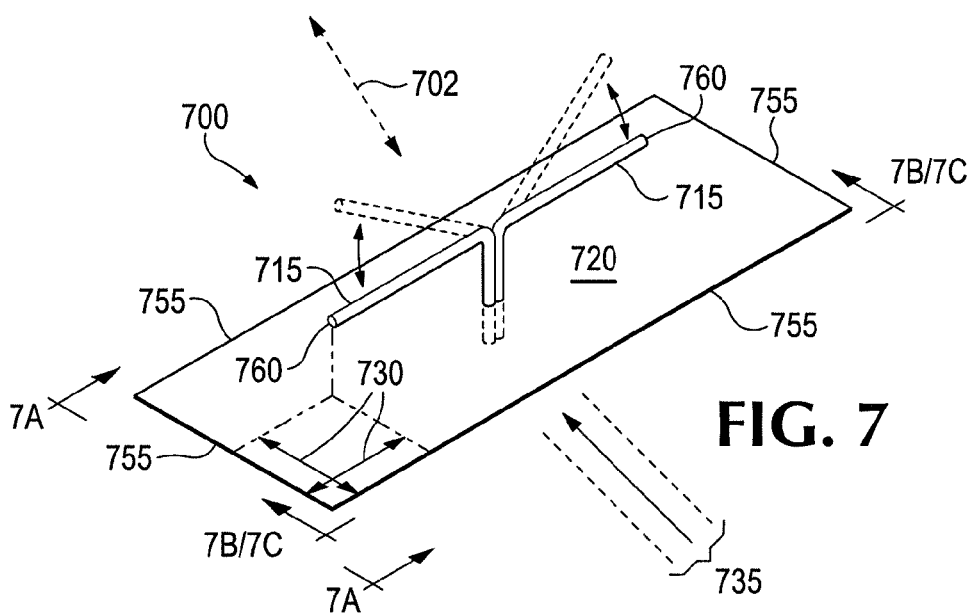
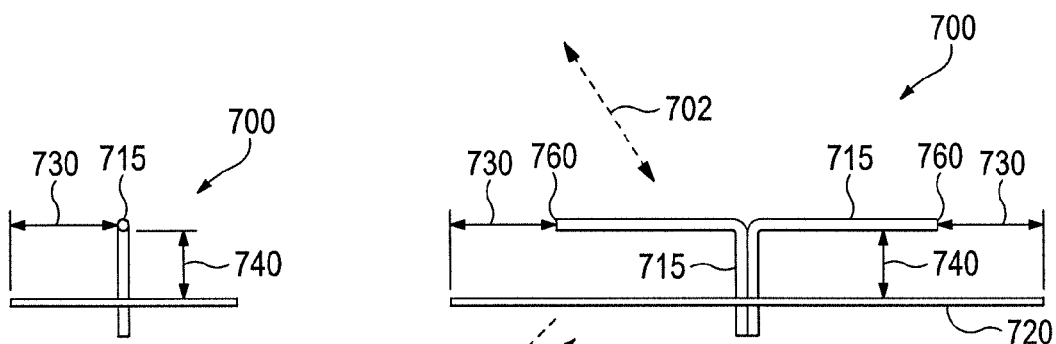
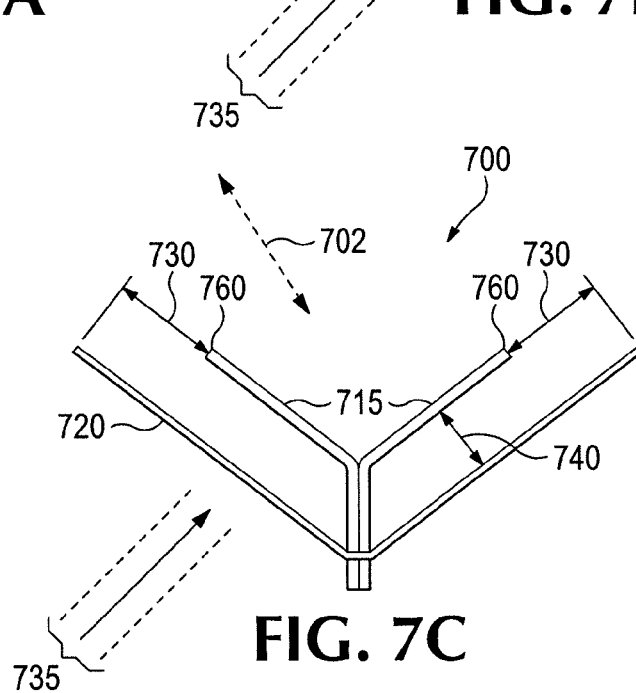

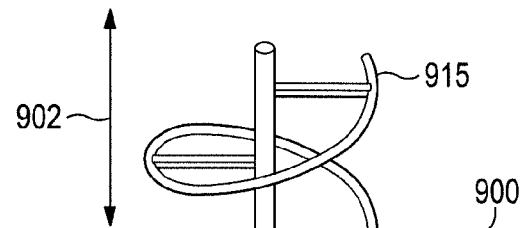
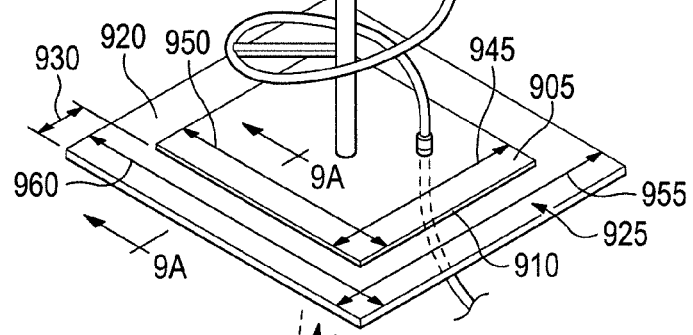
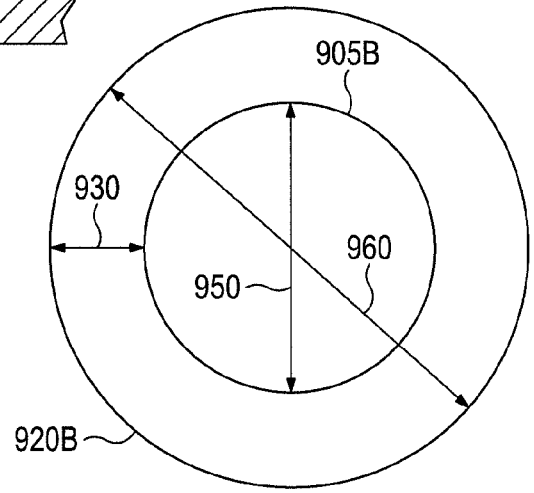
FIG. 9
FIG. 9A
FIG. 9B

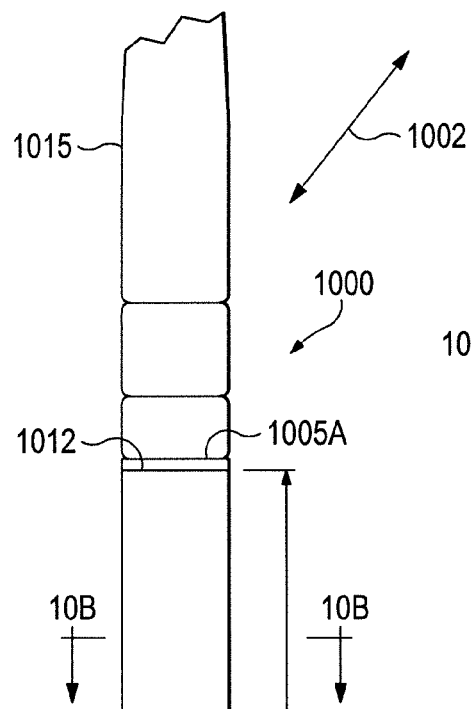
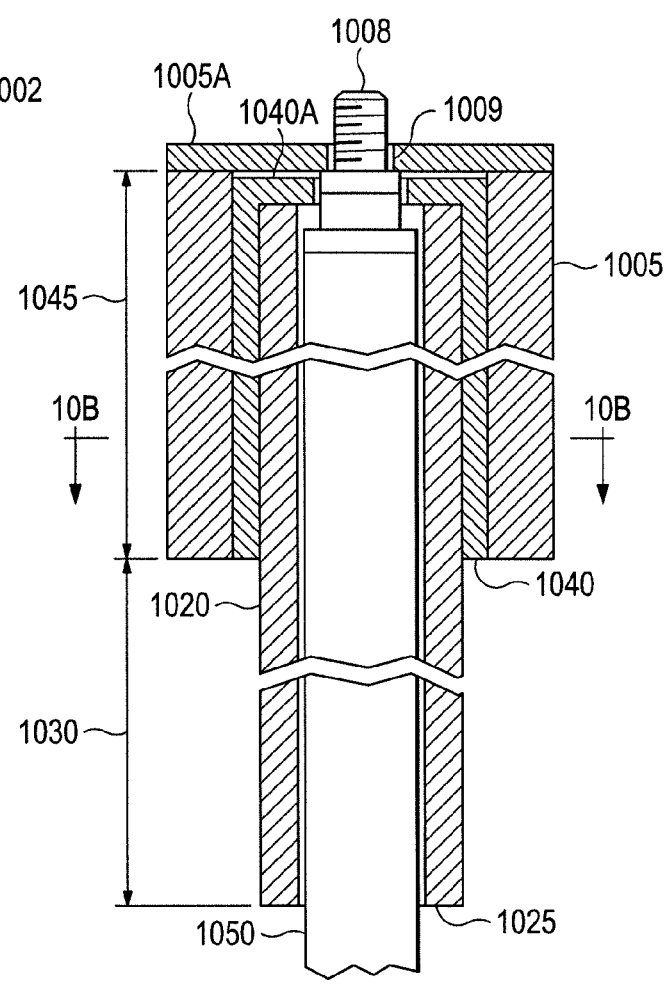
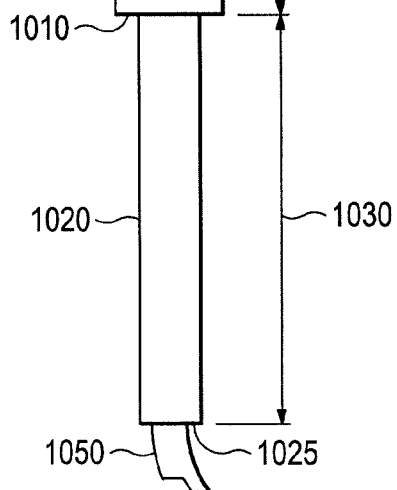
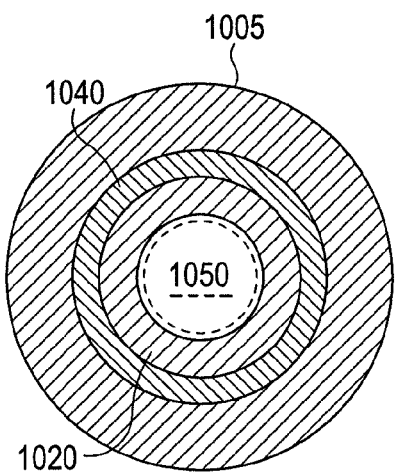
FIG. 10  FIG. 10A
FIG. 10B

ANTENNA APPARATUS AND METHOD FOR REDUCING BACKGROUND NOISE AND INCREASING RECEPTION SENSITIVITY

RELATED APPLICATION DATA

This application is a division of U.S. application Ser. No. 13/431,746, filed, Mar. 27, 2012, now U.S. Pat. No. 8,854,275, which is a continuation-in-part of U.S. application Ser. No. 13/039,981, filed Mar. 3, 2011, now U.S. Pat. No. 8,164,527, and incorporated by reference herein.

GOVERNMENT FUNDING

Some of the content herein was at least partially funded by a government contract, USEPA EP-D-07-086.

TECHNICAL FIELD

This disclosure relates to antennas, and, more particularly, to an apparatus and method for reducing unwanted electromagnetic interference and increasing the reception sensitivity of antennas.

BACKGROUND

Electromagnetic signals are widely used to transmit or receive information through the air between antennas. Modern day communications are heavily reliant on such transmissions including vast networks of hand-held wireless devices, cellular towers, radios, satellites, global positioning systems, and so forth. Each of the devices associated with such networks include an antenna. The antenna can take various forms and can function in a variety of different ways. Importantly, it is the quality and configuration of the antenna that can make the difference between a strong and coherent signal and one that is compromised by unwanted electromagnetic interference.

Conventional approaches to reducing background noise and improving the function and efficiency of antennas include implementing specialized electronics to filter noise, boost the transmitting power, or implement frequency hopping protocols, and the like. Some have focused on the shape or construction of the antenna itself. Others have attempted to construct plastic moldings or metal fibers to help focus or enhance the signal. Still others have used carbon, plastics, metal meshes, and the like, to make certain components of the antenna more rigid, or to reflect or conduct signals.

However, even in view of these attempts and advances, consumers, businesses and governments are still plagued by disconnected telephone calls, slow internet reception, faulty transmission of information, inaccurate signals, and so forth. Such unreliability, especially when considered with the additional power consumption by devices implementing some of the approaches mentioned above, presents significant problems for society at large.

Accordingly, a need remains for an improved antenna apparatus, which reduces background noise and increases reception sensitivity without increasing power usage of the antenna apparatus.

BRIEF DESCRIPTION OF THE DRAWINGS

FIG. 1 illustrates a perspective view of an example of an antenna apparatus including electromagnetic absorbing carbon elements according to one embodiment of the present invention.

FIG. 1A illustrates a side elevation view of the antenna apparatus of FIG. 1 in the direction of lines 1A-1A.

FIG. 2 illustrates a perspective view of another example of an antenna apparatus including electromagnetic absorbing elements according to another embodiment of the present invention.

FIG. 2A illustrates a cross-sectional view of the antenna apparatus of FIG. 2 taken along lines 2A-2A.

FIG. 3 illustrates a perspective view of yet another example of an antenna apparatus including electromagnetic absorbing elements according to yet another embodiment of the present invention.

FIG. 3A is a side elevation view of the antenna apparatus of FIG. 3 in the direction of lines 3A-3A.

FIG. 3B is a front elevation view of the antenna apparatus of FIG. 3 in the direction of lines 3B-3B.

FIG. 5 illustrates a perspective view of a hand-held wireless device including an antenna apparatus embedded therein, and including electromagnetic absorbing elements of one form associated with the wireless device.

FIG. 5A illustrates a side elevation view of the wireless device of FIG. 5 in the direction of lines 5A-5A.

FIG. 6 illustrates a hand-held wireless device including an antenna apparatus embedded therein, and including electromagnetic absorbing elements of another form associated with the wireless device.

FIG. 6A illustrates a cross-sectional view of the wireless device of FIG. 6 taken along lines 6A-6A.

FIG. 7 illustrates a perspective view of another example of an antenna apparatus including electromagnetic absorbing elements according to another embodiment of the present invention.

FIG. 7A illustrates side elevation view of the antenna apparatus of FIG. 7 in the direction of lines 7A-7A.

FIG. 7B illustrates a cross-sectional view of the antenna apparatus of FIG. 7 taken along lines 7B/C-7B/C.

FIG. 7C illustrates a cross-sectional view of the antenna apparatus of FIG. 7 taken along lines 7B/C-7B/C.

FIG. 9 is a perspective view of a helical antenna according to another embodiment of the invention.

FIG. 9A is a side view of the base portion of the antenna of FIG. 9.

FIG. 9B is a perspective view of a variation of FIG. 9 in which the base portion is circular.

FIG. 10 is a side elevation view of a monopole antenna according to another embodiment of the invention.

FIG. 10A is a lengthwise sectional view of the ground plane element of the antenna of FIG. 10.

FIG. 10B is a cross-sectional view of the ground plane element of the antenna of FIG. 10.

Figure 4:
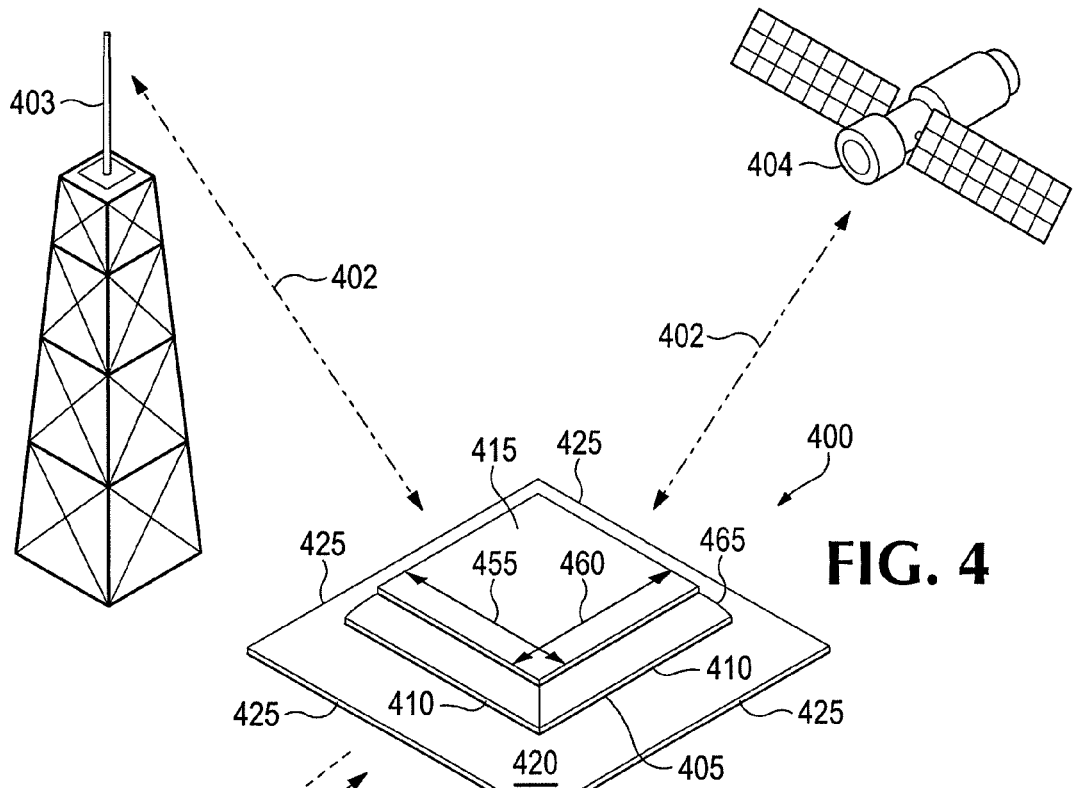
FIG. 4 illustrates a perspective view of still another example of an antenna apparatus including electromagnetic absorbing elements according to still another embodiment of the present invention.

The foregoing and other features of the invention will become more readily apparent from the following detailed description, which proceeds with reference to the accompanying drawings.

DETAILED DESCRIPTION

FIG. 1 illustrates a perspective view of an example of an antenna apparatus 100 including electromagnetic absorbing carbon elements 120 according to one embodiment of the present invention. FIG. 1A illustrates a side elevation view of the antenna apparatus 100 of FIG. 1 in the direction of lines 1A-1A. Reference is now made to FIGS. 1 and 1A.

The antenna apparatus 100 includes an electrically conductive section 105 having peripheral edges 110. The electrically conductive section 105 can be made of any suitable metallic or other conductive material. An antenna element 115 is coupled to the electrically conductive section 105 and can transmit or receive one or more electromagnetic signals 102 through the air. The electromagnetic signals 102 can take any one of a variety forms, with any suitable amplitude, frequency, wavelength, and so forth, and can include either analog or digital data. The antenna apparatus 100 includes a carbon material component 120 disposed adjacent to the electrically conductive section 105. The carbon material component includes a border region 125 extending beyond the peripheral edges 110 of the electrically conductive section 105.

The border region 125 of the carbon material component extends beyond the peripheral edges 110 of the electrically conductive section by at least a distance 130 of $\lambda$ divided by 4 ($\lambda/4$), where $\lambda$ corresponds to the maximum wavelength of the one or more electromagnetic signals 102 capable of being transmitted or received using the antenna element 115. In some embodiments, the distance 130 can correspond to $\lambda/2$, $\lambda$, or $2\lambda$, among other suitable values, greater than $\lambda/4$. It should be understood that while preferably the dimension of distance 130 is $\lambda/4$ or thereabout, other values mentioned herein can be used.

Furthermore, a distance 140 between a surface of the carbon material component 120 and the electrically conductive section 105 is less than or equal to $\lambda$ divided by 4 ($\lambda/4$), where $\lambda$ corresponds to the maximum wavelength of the one or more electromagnetic signals 102 capable of being transmitted or received using the antenna element 115. In some embodiments, the distance 140 can correspond to $\lambda/8$, $\lambda/16$, or $\lambda/32$, among other suitable values, less than $\lambda/4$. It should be understood that while preferably the dimension of distance 140 is $\lambda/4$ or thereabout, other values mentioned herein can be used.

More specifically, the electrically conductive section 105 is a substantially planar antenna ground plane 105 having at least a width dimension 145 and a length dimension 150. The antenna element 115 is a substantially cylindrical rod or beam antenna, which is arranged at a normal relative to the antenna ground plane 105. The carbon material component 120 is substantially planar and arranged parallel to the antenna ground plane 105. The carbon material component 120 includes a width dimension 155 greater than the width dimension 145 of the ground plane by at least a distance of $\lambda$ divided by 2 ($\lambda/2$). The carbon material component 120 includes a length dimension 160 greater than the length dimension 150 of the ground plane by at least a distance of $\lambda$ divided by 2 ($\lambda/2$).

The carbon material component 120 is structured to reduce background interference or noise 135 of the one or more electromagnetic signals transmitted or received by the antenna element 115. In other words, background interference or noise 135 is reduced so that the one or more electromagnetic signals is more effectively transmitted by the antenna element 115, and/or reception sensitivity of the antenna element 115 is enhanced. In this manner, the integrity and quality of signals transferred between antennas is improved. It should be understood that while the background interference 135 is illustrated in relation to the antenna apparatus 100 arriving from one particular angle or direction, the background interference can arrive from multiple locations and angles, some or all of which can be reduced or eliminated by the carbon material component 120.

In some embodiments, the carbon material component 120 is disposed directly adjacent to and in contact with the electrically conductive ground plane 105. In some embodiments, the carbon material component 120 is adjacent to but not necessarily in contact with the electrically conductive ground plane 105.

The carbon material preferably includes a resin impregnated carbon fiber fabric having a specific resistance of less than or equal to 100 ohms per centimeter squared (100 $\Omega/cm^2$). The carbon material component 120 is constructed and arranged to increase the effective signal to noise ratio of the antenna apparatus, as disclosed and illustrated herein. For example, the carbon material component 120 can increase the effective signal to noise ratio by a minimum of approximately three decibels. Moreover, the carbon material component 120 increases the reception range of the one or more electromagnetic signals 102 by up to 1.4 times with no additional power consumption of the antenna apparatus 100. In other words, for a given baseline power consumption level of the antenna apparatus 100 in which a certain level of reception performance is attained, the carbon material component 120 when constructed and arranged as set forth herein, significantly increases the reception performance without increasing the baseline power consumption level.

In some embodiments, the carbon material component 120 is encapsulated with an insulation layer to electrically isolate the carbon material component from electrical contact with any other element of the antenna apparatus 100, and to electrically isolate the carbon material component 120 from earth ground.

FIG. 2 illustrates a perspective view of another example of an antenna apparatus 200 including electromagnetic absorbing elements according to another embodiment of the present invention. FIG. 2A illustrates a cross-sectional view of the antenna apparatus 200 of FIG. 2 taken along lines 2A-2A.

The antenna apparatus 200 includes an electrically conductive section 205 having peripheral edges 210. The electrically conductive section 205 can be made of any suitable metallic or other conductive material. The surfaces of section 205 need not be smooth surfaces, but can rather include a mesh surface, wire grill, or the like. An antenna element 215 is coupled to the electrically conductive section 205 and can transmit or receive one or more electromagnetic signals 202 through the air. The electromagnetic signals 202 can take any one of a variety forms, with any suitable amplitude, frequency, wavelength, and so forth, and can include either analog or digital data. The antenna apparatus 200 includes a carbon material component 220 disposed adjacent to the electrically conductive section 205. The carbon material component includes a border region 225 extending beyond the peripheral edges 210 of the electrically conductive section 205.

The border region 225 of the carbon material component extends beyond the peripheral edges 210 of the electrically conductive section by at least a distance 230 of λ divided by 4 (λ/4), where λ corresponds to the maximum wavelength of the one or more electromagnetic signals 202 capable of being transmitted or received using the antenna element 215. In some embodiments, the distance 230 can correspond to λ/2, λ, or 2λ, among other suitable values, greater than λ/4. It should be understood that while preferably the dimension of distance 230 is λ/4 or thereabout, other values mentioned herein can be used.

Furthermore, a distance 240 between a surface of the carbon material component 220 and the electrically conductive section 205 is less than or equal to λ divided by 4 (λ/4), where λ corresponds to the maximum wavelength of the one or more electromagnetic signals 202 capable of being transmitted or received using the antenna element 215. In some embodiments, the distance 240 can correspond to λ/8, λ/16, or λ/32, among other suitable values, less than λ/4. It should be understood that while preferably the dimension of distance 240 is λ/4 or thereabout, other values mentioned herein can be used.

More specifically, the electrically conductive section 205 includes a substantially parabolic reflector surface 205 in which at least one cross section of the reflector surface corresponds to a parabola. The antenna element is a feed antenna 215 arranged to receive the one or more electromagnetic signals using the parabolic reflector surface 205. The carbon material component 220 includes a substantially parabolic surface 220 in which at least one cross section of the carbon material surface corresponds to a parabola. The border region 225 of the parabolic carbon material surface 220 extends beyond the peripheral edges 210 of the parabolic reflector surface 205 by at least a distance of λ divided by 4 (λ/4).

The substantially parabolic reflector surface 205 can be dish-shaped and include size dimensions such as depth, width, and diameter of the dish. The substantially parabolic carbon material surface 220 is also dish-shaped and includes size dimensions that are generally larger than the size dimensions of the dish-shaped reflector surface. For example, the depth of the parabolic carbon material surface 220 can be larger than the depth of the parabolic reflector surface 205, and the edge portions 225 can extend further relative to the edge portions 210 of the reflector surface 205. The distance 240 between the dish-shaped parabolic reflector surface 205 and the dish-shaped carbon material surface 220 is less than or equal to λ divided by 4 (λ/4), as mentioned above.

The parabolic carbon material component 220 is structured to reduce background interference or noise 235 of the one or more electromagnetic signals transmitted or received by the antenna element 215. In other words, background interference or noise 235 is reduced so that the one or more electromagnetic signals is more effectively transmitted by the antenna element 215, and/or reception sensitivity of the antenna element 215 is enhanced. In this manner, the integrity and quality of signals transferred between antennas is improved.

In some embodiments, the parabolic carbon material component 220 is disposed directly adjacent to and in contact with the parabolic reflector surface 205. In some embodiments, the parabolic carbon material component 220 is adjacent to but not necessarily in contact with the parabolic reflector surface 205.

The parabolic carbon material component 220 preferably includes a resin impregnated carbon fiber fabric having a specific resistance of less than or equal to 100 ohms per centimeter squared (100 Ω/cm$^2$). The parabolic carbon material component 220 is constructed and arranged to increase the effective signal to noise ratio of the antenna apparatus, as disclosed and illustrated herein. For example, the parabolic carbon material component 220 can increase the effective signal to noise ratio by a minimum of approximately three decibels. Moreover, the parabolic carbon material component 220 increases the reception range of the one or more electromagnetic signals 202 by up to 1.4 times with no additional power consumption of the antenna apparatus 200. In other words, for a given baseline power consumption level of the antenna apparatus 200 in which a certain level of reception performance is attained, the carbon material component 220 when constructed and arranged as set forth herein, significantly increases the reception performance without increasing the baseline power consumption level.

In some embodiments, the parabolic carbon material component 220 is encapsulated with an insulation layer to electrically isolate the carbon material component from electrical contact with any other element of the antenna apparatus 200, and to electrically isolate the carbon material component 220 from earth ground.

FIG. 3 illustrates a perspective view of yet another example of an antenna apparatus including electromagnetic absorbing elements according to yet another embodiment of the present invention. FIG. 3A is a side elevation view of the antenna apparatus of FIG. 3 in the direction of lines 3A-3A. FIG. 3B is a front elevation view of the antenna apparatus of FIG. 3 in the direction of lines 3B-3B. Reference is now made to FIGS. 3, 3A, and 3B.

The antenna apparatus 300 includes a "YAGI" or "YAGI-UDA" type antenna element 305/310 defined by peripheral edges 330. The antenna element is structured to transmit or receive one or more electromagnetic signals 302. The antenna element 305/310 can be made of any suitable metallic or other conductive material. The electromagnetic signals 302 can take any one of a variety forms, with any suitable amplitude, frequency, wavelength, and so forth, and can include either analog or digital data.

One or more carbon material components 337/340 can be disposed adjacent to the antenna element. The carbon material components include a border region (e.g., 355/345) extending beyond the peripheral edges 330 of the antenna element 305/310. The border region (e.g., 355/345) of the carbon material components extends beyond the peripheral edges 330 of the antenna element by at least a distance 336 of λ divided by 4 (λ/4), where λ corresponds to the maximum wavelength of the one or more electromagnetic signals 302 capable of being transmitted or received using the antenna element 305/310. In some embodiments, the distance 336 can correspond to λ/2, λ, or 2λ, among other suitable values, greater than λ/4. It should be understood that while preferably the dimension of distance 336 is λ/4 or thereabout, other values mentioned herein can be used.

Furthermore, a distance 332 between a surface of each of the carbon material components 337/340 and the antenna element 305/310 is less than or equal to λ divided by 4 (λ/4), where λ corresponds to the maximum wavelength of the one or more electromagnetic signals 302 capable of being transmitted or received using the antenna element 305/310. In addition, the distance 334 between the carbon material components 337/340 is less than or equal to λ divided by 2 (λ/2). In some embodiments, the distance 332 can correspond to λ/8, λ/16, or λ/32, among other suitable values, less than λ/4. It should be understood that while preferably the dimension of distance 332 is λ/4 or thereabouts, other values mentioned herein can be used.

More specifically, the antenna element 305/310 includes an electrically conductive boom 305 and electrically conductive perpendicular elements 310 arranged perpendicular to the boom 305 and parallel to one another. Each of the perpendicular elements 310 is coupled to the boom 305, and each includes a particular length. The particular length decreases for each perpendicular element 310 from one end 315 of the boom to the other end 320 of the boom. The boom 305 and the perpendicular elements 310 together correspond to the antenna element 305/310 of the antenna apparatus defined by a substantially trapezoidal shape 325 having peripheral edges 330. The antenna element 305/310 of the antenna apparatus 300 is arranged in a particular plane 3B-3B and is structured to transmit or receive one or more electromagnetic signals.

A first trapezoidal shaped carbon material component 337 is disposed adjacent to the antenna element 305/310 to a first side thereof, in a plane parallel to the particular plane of the antenna element. The first carbon material component 337 includes a border region 355 extending beyond the peripheral edges 330 of the antenna element 305/310.

A second trapezoidal shaped carbon material component 340 is disposed adjacent to the antenna element 305/310 to a second side thereof opposite the first side, in a plane parallel to the particular plane of the antenna. The second carbon material component 340 includes a border region 345 extending beyond the peripheral edges 330 of the antenna element 305/310. The border region 355/345 of each of the first and second carbon material components 337/340 extends beyond the peripheral edges 330 of the antenna element 305/310 by at least a distance of λ divided by 4 (λ/4), where λ corresponds to the maximum wavelength of the one or more electromagnetic signals 302 capable of being transmitted or received using the antenna element 305/310.

The carbon material components 337/340 are structured to reduce background interference or noise 335 of the one or more electromagnetic signals transmitted or received by the antenna element 305/310. In other words, background interference or noise 335 is reduced so that the one or more electromagnetic signals is more effectively transmitted by the antenna element 305/310, and/or reception sensitivity of the antenna element 305/310 is enhanced. In this manner, the integrity and quality of signals transferred between antennas is improved. It should be understood that while the background interference 335 is illustrated in relation to the antenna apparatus 300 arriving from one particular angle or direction, the background interference can arrive from multiple locations and angles, some or all of which can be reduced or eliminated by the carbon material components 337/340.

In some embodiments, the carbon material components 337/340 are disposed directly adjacent to and in contact with the antenna element 305/310. In some embodiments, the carbon material components 337/340 are adjacent to but not necessarily in contact with the antenna element 305/310.

The carbon material preferably includes a resin impregnated carbon fiber fabric having a specific resistance of less than or equal to 100 ohms per centimeter squared (100 $\Omega/cm^2$). The carbon material components 337/340 are constructed and arranged to increase the effective signal to noise ratio of the antenna apparatus, as disclosed and illustrated herein. For example, the carbon material components 337/340 can increase the effective signal to noise ratio by a minimum of approximately three decibels. Moreover, the carbon material components 337/340 increase the reception range of the one or more electromagnetic signals 302 by up to 1.4 times with no additional power consumption of the antenna apparatus 300. In other words, for a given baseline power consumption level of the antenna apparatus 300 in which a certain level of reception performance is attained, the carbon material components 337/340 when constructed and arranged as set forth herein, significantly increases the reception performance without increasing the baseline power consumption level.

In some embodiments, the carbon material components 337/340 are each encapsulated with an insulation layer to electrically isolate the carbon material component from electrical contact with any other element of the antenna apparatus 300, and to electrically isolate the carbon material components 337/340 from earth ground.

Figure 4A:
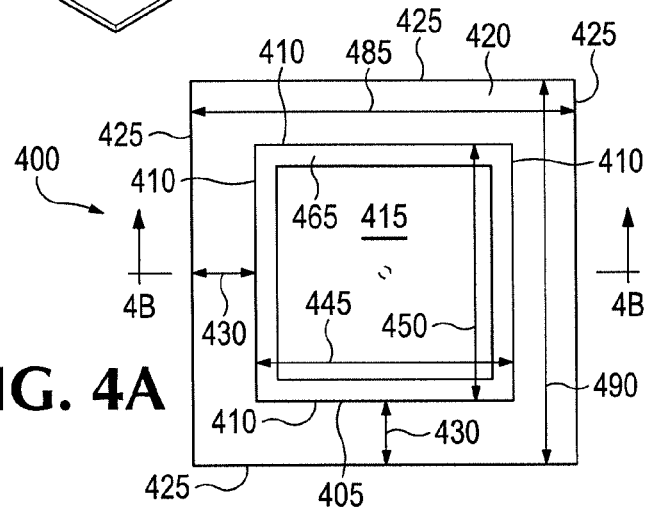
FIG. 4A illustrates a plan view of the antenna apparatus of FIG. 4.
Figure 4B:
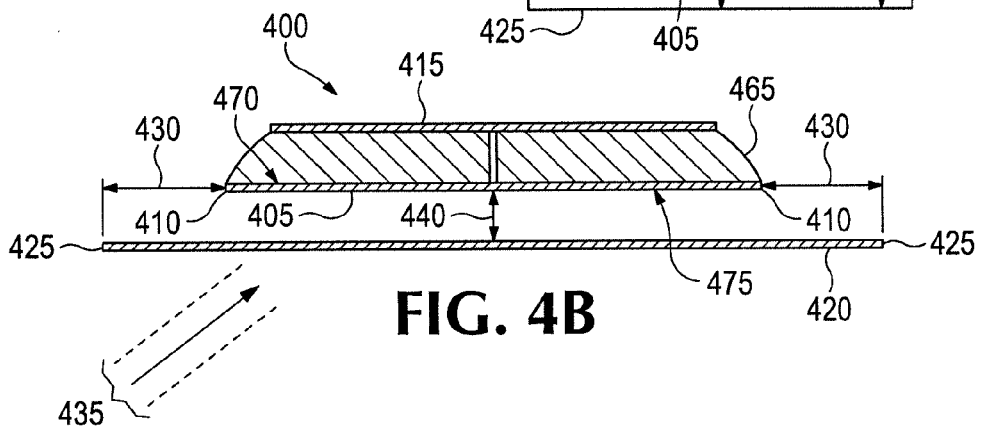
FIG. 4B illustrates a cross-sectional view of the antenna apparatus of FIG. 4A taken along lines 4B-4B.

FIG. 4 illustrates a perspective view of still another example of an antenna apparatus 400 including electromagnetic absorbing elements according to still another embodiment of the present invention. FIG. 4A illustrates a plan view of the antenna apparatus 400 of FIG. 4. FIG. 4B illustrates a cross-sectional view of the antenna apparatus 400 of FIG. 4A taken along lines 4B-4B. Reference is now made to FIGS. 4, 4A, and 4B.

The antenna apparatus 400 includes an electrically conductive section 405 having peripheral edges 410. The electrically conductive section 405 can be made of any suitable metallic or other conductive material. An antenna element 415 is coupled to the electrically conductive section 405 and can transmit or receive one or more electromagnetic signals 402 through the air between, for example, satellite 404 and/or radio tower 403. The electromagnetic signals 402 can take any one of a variety forms, with any suitable amplitude, frequency, wavelength, and so forth, and can include either analog or digital data. The antenna apparatus 400 includes a carbon material component 420 disposed adjacent to the electrically conductive section 405. The carbon material component includes a border region 425 extending beyond the peripheral edges 410 of the electrically conductive section 405.

The border region 425 of the carbon material component extends beyond the peripheral edges 410 of the electrically conductive section by at least a distance 430 of λ divided by 4 (λ/4), where λ corresponds to the maximum wavelength of the one or more electromagnetic signals 402 capable of being transmitted or received using the antenna element 415. In some embodiments, the distance 430 can correspond to λ/2, λ, or 2λ, among other suitable values, greater than λ/4. It should be understood that while preferably the dimension of distance 430 is λ/4 or thereabout, other values mentioned herein can be used.

Furthermore, a distance 440 between a surface of the carbon material component 420 and the electrically conductive section 405 is less than or equal to λ divided by 4 (λ/4), where λ corresponds to the maximum wavelength of the one or more electromagnetic signals 402 capable of being transmitted or received using the antenna element 415. In some embodiments, the distance 440 can correspond to λ/8, λ/16, or λ/32, among other suitable values, less than λ/4. It should be understood that while preferably the dimension of distance 440 is λ/4 or thereabout, other values mentioned herein can be used.

More specifically, the antenna apparatus 400 is a patch and/or microstrip antenna 400, in which the electrically conductive section 405 is a substantially planar antenna ground plane 405 having a width dimension 445 and a length dimension 450. The antenna element 415 is a substantially planar electrically conductive patch having a width dimension 455 less than the width dimension 445 of the ground plane 405 and a length dimension 460 less than the length dimension 450 of the ground plane 405. In addition, a substrate 465 can be disposed between the ground plane 405 and the electrically conductive patch 415 in which a first surface 470 of the ground plane 405 is adjacent to and in contact with the substrate 465.

The carbon material component 420 is substantially planar and arranged parallel to a second surface 475 of the ground plane 405 opposite the first surface 470. The carbon material component 420 includes a width dimension 485 and a length dimension 490. The width dimension 485 of the carbon material component 420 is greater than the width dimension 445 of the ground plane 405 by at least a distance of λ divided by 2 (λ/2). The length dimension 490 of the carbon material component 420 is greater than the length dimension 450 of the ground plane 405 by at least a distance of λ divided by 2 (λ/2).

The carbon material component 420 is structured to reduce background interference or noise 435 of the one or more electromagnetic signals transmitted or received by the antenna element 415. In other words, background interference or noise 435 is reduced so that the one or more electromagnetic signals is more effectively transmitted by the antenna element 415, and/or reception sensitivity of the antenna element 415 is enhanced. In this manner, the integrity and quality of signals transferred between antennas is improved. It should be understood that while the background interference 435 is illustrated in relation to the antenna apparatus 400 arriving from one particular angle or direction, the background interference can arrive from multiple locations and angles, some or all of which can be reduced or eliminated by the carbon material component 420.

In some embodiments, the carbon material component 420 is disposed directly adjacent to and in contact with the electrically conductive ground plane 405. In some embodiments, the carbon material component 420 is adjacent to but not necessarily in contact with the electrically conductive ground plane 405.

The carbon material preferably includes a resin impregnated carbon fiber fabric having a specific resistance of less than or equal to 100 ohms per centimeter squared (100 $\Omega/cm^2$). The carbon material component 420 is constructed and arranged to increase the effective signal to noise ratio of the antenna apparatus, as disclosed and illustrated herein. For example, the carbon material component 420 can increase the effective signal to noise ratio by a minimum of approximately three decibels. Moreover, the carbon material component 420 increases the reception range of the one or more electromagnetic signals 402 by up to 1.4 times with no additional power consumption of the antenna apparatus 400. In other words, for a given baseline power consumption level of the antenna apparatus 400 in which a certain level of reception performance is attained, the carbon material component 420 when constructed and arranged as set forth herein, significantly increases the reception performance without increasing the baseline power consumption level.

In some embodiments, the carbon material component 420 is encapsulated with an insulation layer to electrically isolate the carbon material component from electrical contact with any other element of the antenna apparatus 400, and to electrically isolate the carbon material component 420 from earth ground.

FIG. 5 illustrates a perspective view of a hand-held wireless device 500 including an antenna apparatus 530 embedded therein, and including electromagnetic absorbing elements of one form associated with the wireless device. FIG. 5A illustrates a side elevation view of the wireless device of FIG. 5 in the direction of lines 5A-5A. FIG. 6 illustrates the hand-held wireless device 500 including an antenna apparatus 530 embedded therein, and including electromagnetic absorbing elements of another form associated with the wireless device. FIG. 6A illustrates a cross-sectional view of the wireless device of FIG. 6 taken along lines 6A-6A. Reference is now made to FIGS. 5, 5A, 6, and 6A.

The wireless device 500 includes a housing 505 having a display 510 to provide a user interface on a front side 515 thereof. The housing includes a reference plane 520 associated with a back side 520 of the housing 505. The reference plane 520 includes peripheral edges 525. A patch and/or microstrip antenna 530 can be embedded at least partially within the housing 505 and structured to transmit or receive one or more electromagnetic signals. It should be understood that while a patch and/or microstrip antenna is the preferred type of antenna embedded therein, other suitable antenna types can be used.

A carbon material component 537 is disposed adjacent to the back side 520 of the housing 505. The carbon material component 537 includes a border region 540 extending beyond the peripheral edges 525 of the reference plane 520. The border region 540 of the carbon material component 537 extends beyond the peripheral edges 525 of the reference plane 520 by at least a distance 545 of λ divided by 4 (λ/4), where λ corresponds to the maximum wavelength of the one or more electromagnetic signals 502 capable of being transmitted or received using the patch and/or microstrip antenna 530. In some embodiments, the distance 545 can correspond to λ/2, λ, or 2λ, among other suitable values, greater than λ/4. It should be understood that while preferably the dimension of distance 545 is λ/4 or thereabout, other values mentioned herein can be used.

Furthermore, a distance 550 between a surface 537 of the carbon material component 537 and a surface 520 of the reference plane 520 is less than or equal to λ divided by 4 (λ/4), where λ corresponds to the maximum wavelength of the one or more electromagnetic signals 502 capable of being transmitted or received using the antenna element 530. In some embodiments, the distance 550 can correspond to λ/8, λ/16, or λ/32, among other suitable values, less than λ/4. It should be understood that while preferably the dimension of distance 550 is λ/4 or thereabout, other values mentioned herein can be used.

The carbon material component 537 is structured to reduce background interference or noise 535 of the one or more electromagnetic signals transmitted or received by the antenna element 530. In other words, background interference or noise 535 is reduced so that the one or more electromagnetic signals is more effectively transmitted by the antenna element 530, and/or reception sensitivity of the antenna element 530 is enhanced. In this manner, the integrity and quality of signals transferred between antennas is improved. It should be understood that while the background interference 535 is illustrated in relation to the wireless device 500 arriving from one particular angle or direction, the background interference can arrive from multiple locations and angles, some or all of which can be reduced or eliminated by the carbon material component 537.

In some embodiments, at least a first portion 552 of the carbon material component 537 is disposed directly adjacent to and parallel with a surface 520 of the reference plane 520 of the housing 505. Moreover, at least a second portion 555 of the carbon material component 537 is curve-shaped on the edges 540 for gripping thereof. The curvatures 540 in the carbon material component 537 also enhance blockage of unwanted electromagnetic interference 535, which can otherwise interfere with communication signals of the hand-held wireless device 500.

The carbon material preferably includes a resin impregnated carbon fiber fabric having a specific resistance of less than or equal to 100 ohms per centimeter squared (100 $\Omega/cm^2$). The carbon material component 537 is constructed and arranged to increase the effective signal to noise ratio of the antenna apparatus, as disclosed and illustrated herein. For a given baseline power consumption level of the antenna apparatus 530 in which a certain level of reception performance is attained, the carbon material component 537 when constructed and arranged as set forth herein, significantly increases the reception performance without increasing the baseline power consumption level.

In some embodiments, the carbon material component 537 is encapsulated with an insulation layer to electrically isolate the carbon material component from electrical contact with any other element of the hand-held wireless device 500, and to electrically isolate the carbon material component 537 from earth ground.

FIG. 7 illustrates a perspective view of another example of an antenna apparatus 700 including electromagnetic absorbing elements according to another embodiment of the present invention. FIG. 7A illustrates side elevation view of the antenna apparatus 700 of FIG. 7 in the direction of lines 7A-7A. FIG. 7B illustrates a cross-sectional view of the antenna apparatus 700 of FIG. 7 in one configuration taken along lines 7B/C-7B/C. FIG. 7C illustrates a cross-sectional view of the antenna apparatus 700 of FIG. 7 in another configuration taken along lines 7B/C-7B/C. Reference is now made to FIGS. 7, 7A, 7B, and 7C.

The antenna apparatus 700 includes a dipole or "rabbit ear" antenna element 715 having peripheral edges 760. The antenna element 715 is structured to transmit or receive one or more electromagnetic signals 702. The antenna element 715 can be made of any suitable metallic or other conductive material. The electromagnetic signals 702 can take any one of a variety forms, with any suitable amplitude, frequency, wavelength, and so forth, and can include either analog or digital data.

A carbon material component 720 can be disposed adjacent to the antenna element 715. The carbon material component 720 includes a border region 755 extending beyond the peripheral edges 760 of the antenna element 715. The border region 755 of the carbon material component extends beyond the peripheral edges 760 of the antenna element by at least a distance 730 of $\lambda$ divided by 4 ($\lambda/4$), where $\lambda$ corresponds to the maximum wavelength of the one or more electromagnetic signals 702 capable of being transmitted or received using the antenna element 715. In some embodiments, the distance 730 can correspond to $\lambda/2$, $\lambda$, or $2\lambda$, among other suitable values, greater than $\lambda/4$. It should be understood that while preferably the dimension of distance 730 is $\lambda/4$ or thereabout, other values mentioned herein can be used.

Furthermore, a distance 740 between a surface of the carbon material component 720 and the antenna element 715 is less than or equal to $\lambda$ divided by 4 ($\lambda/4$), where $\lambda$ corresponds to the maximum wavelength of the one or more electromagnetic signals 702 capable of being transmitted or received using the antenna element 715. In some embodiments, the distance 740 can correspond to $\lambda/8$, $\lambda/16$, or $\lambda/32$, among other suitable values less than $\lambda/4$. It should be understood that while preferably the dimension of distance 740 is $\lambda/4$ or thereabout, other values mentioned herein can be used.

The antenna element 715 is an adjustable antenna element structured to be maneuvered into one of a plurality of configurations. Further, the carbon material component 720 can be adjustable and maneuvered into one of a plurality of similar configurations. The carbon material component 720 and the antenna element 715 are structured to accommodate the $\lambda$ divided by 4 ($\lambda/4$) distance relationship between the border region 755 of the carbon material component 720 and the peripheral edges 760 of the antenna element 715 in each configuration of the antenna element and the carbon material component. Both of the carbon material component 720 and the antenna element 715 can be bent, swiveled, or otherwise adjusted. For instance, as shown in FIG. 7C, when the antenna element 715 is adjusted in a V-type configuration, the carbon material component 720 can likewise be adjusted in a V-type configuration, and the distances 730 and/or 740 can be maintained. To maintain the distance relationship, the carbon material component 720 can be bent inwardly toward the antenna element 715 to maintain the distance 740 relationship, swiveled, and/or extended outwardly to maintain the distance 730 relationship, with the antenna element 715.

The carbon material component 720 is structured to reduce background interference or noise 735 of the one or more electromagnetic signals transmitted or received by the antenna element 715. In other words, background interference or noise 735 is reduced so that the one or more electromagnetic signals is more effectively transmitted by the antenna element 715, and/or reception sensitivity of the antenna element 715 is enhanced. In this manner, the integrity and quality of signals transferred between antennas is improved. It should be understood that while the background interference 735 is illustrated in relation to the antenna apparatus 700 arriving from one particular angle or direction, the background interference can arrive from multiple locations and angles, some or all of which can be reduced or eliminated by the carbon material component 720.

In some embodiments, the carbon material component 720 is disposed directly adjacent to and in contact with the antenna element 715. In some embodiments, the carbon material component 720 is adjacent to but not necessarily in contact with the antenna element 715.

The carbon material preferably includes a resin impregnated carbon fiber fabric having a specific resistance of less than or equal to 100 ohms per centimeter squared (100 $\Omega/cm^2$). The carbon material component 720 is constructed and arranged to increase the effective signal to noise ratio of the antenna apparatus, as disclosed and illustrated herein. For example, the carbon material component 720 can increase the effective signal to noise ratio by a minimum of approximately three decibels. Moreover, the carbon material component 720 can increase the reception range of the one or more electromagnetic signals 702 by up to 1.4 times with no additional power consumption of the antenna apparatus 700. In other words, for a given baseline power consumption level of the antenna apparatus 700 in which a certain level of reception performance is attained, the carbon material component 720 when constructed and arranged as set forth herein, significantly increases the reception performance without increasing the baseline power consumption level.

In some embodiments, the carbon material component 720 is encapsulated with an insulation layer to electrically isolate the carbon material component from electrical contact with any other element of the antenna apparatus 700, and to electrically isolate the carbon material component 720 from earth ground.

Figure 8:
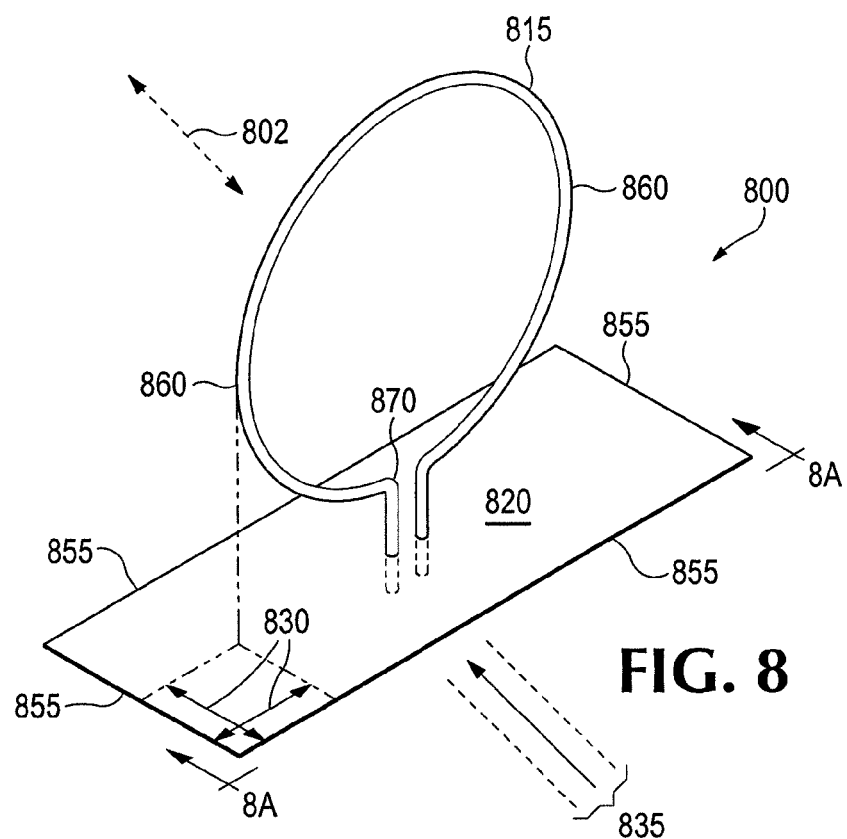
FIG. 8 illustrates a perspective view of yet another example of an antenna apparatus including electromagnetic absorbing elements according to yet another embodiment of the present invention.
Figure 8A:
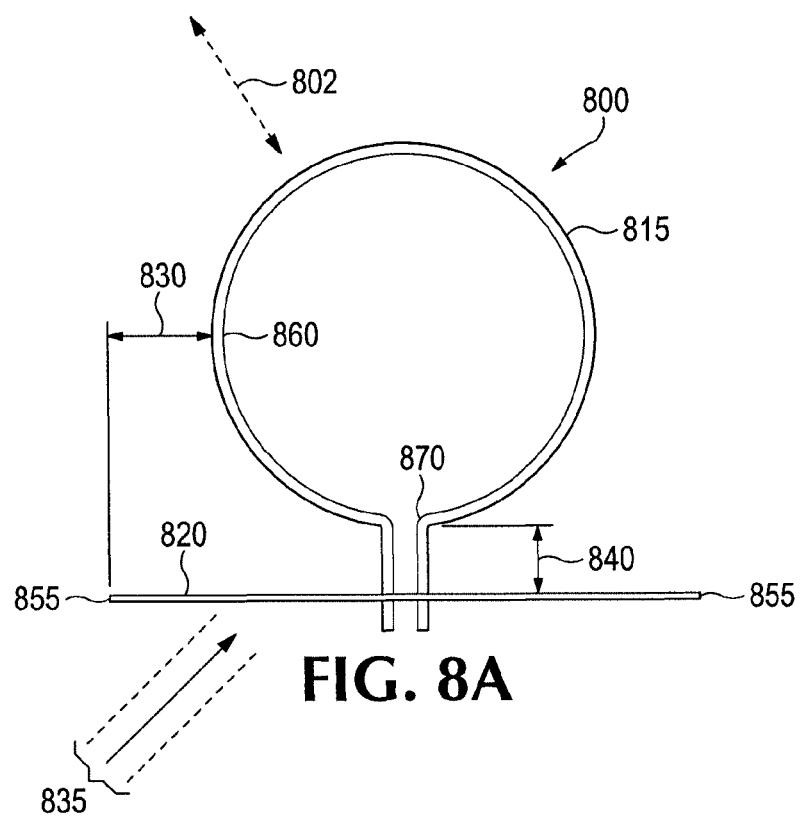
FIG. 8A illustrates side elevation view of the antenna apparatus of FIG. 8 in the direction of lines 8A-8A.

FIG. 8 illustrates a perspective view of yet another example of an antenna apparatus 800 including electromagnetic absorbing elements according to yet another embodiment of the present invention. FIG. 8A illustrates side elevation view of the antenna apparatus 800 of FIG. 8 in the direction of lines 8A-8A. Reference is now made to FIGS. 8 and 8A.

The antenna apparatus 800 includes a "loop" antenna element 815 having peripheral edges 860 and/or 870. The antenna element 815 is structured to transmit or receive one or more electromagnetic signals 802. The antenna element 815 can be made of any suitable metallic or other conductive material. The electromagnetic signals 802 can take any one of a variety of forms, with any suitable amplitude, frequency, wavelength, and so forth, and can include either analog or digital data.

A carbon material component 820 can be disposed adjacent to the antenna element 815. The carbon material component 820 includes a border region 855 extending beyond the peripheral edges 860 and/or 870 of the antenna element 815. The border region 855 of the carbon material component extends beyond the peripheral edges 860 and/or 870 of the antenna element by at least a distance 830 of $\lambda$ divided by 4 ($\lambda/4$), where $\lambda$ corresponds to the maximum wavelength of the one or more electromagnetic signals 802 capable of being transmitted or received using the antenna element 815. In some embodiments, the distance 830 can correspond to $\lambda/2$, $\lambda$, or $2\lambda$, among other suitable values, greater than $\lambda/4$. It should be understood that while preferably the dimension of distance 830 is $\lambda/4$ or thereabout, other values mentioned herein can be used.

Furthermore, a distance 840 between a surface of the carbon material component 820 and the antenna element 815 is less than or equal to $\lambda$ divided by 4 ($\lambda/4$), where $\lambda$ corresponds to the maximum wavelength of the one or more electromagnetic signals 802 capable of being transmitted or received using the antenna element 815. In some embodiments, the distance 840 can correspond to $\lambda/8$, $\lambda/16$, or $\lambda/32$, among other suitable values less than $\lambda/4$. It should be understood that while preferably the dimension of distance 840 is $\lambda/4$ or thereabout, other values mentioned herein can be used.

The carbon material component 820 is structured to reduce background interference or noise 835 of the one or more electromagnetic signals transmitted or received by the antenna element 815. In other words, background interference or noise 835 is reduced so that the one or more electromagnetic signals is more effectively transmitted by the antenna element 815, and/or reception sensitivity of the antenna element 815 is enhanced. In this manner, the integrity and quality of signals transferred between antennas is improved. It should be understood that while the background interference 835 is illustrated in relation to the antenna apparatus 800 arriving from one particular angle or direction, the background interference can arrive from multiple locations and angles, some or all of which can be reduced or eliminated by the carbon material component 820.

In some embodiments, the carbon material component 820 is disposed directly adjacent to and in contact with the antenna element 815. In some embodiments, the carbon material component 820 is adjacent to but not necessarily in contact with the antenna element 815.

The carbon material preferably includes a resin impregnated carbon fiber fabric having a specific resistance of less than or equal to 100 ohms per centimeter squared (100 $\Omega/cm^2$). The carbon material component 820 is constructed and arranged to increase the effective signal to noise ratio of the antenna apparatus, as disclosed and illustrated herein. For example, the carbon material component 820 can increase the effective signal to noise ratio by a minimum of approximately three decibels. Moreover, the carbon material component 820 can increase the reception range of the one or more electromagnetic signals 802 by up to 1.4 times with no additional power consumption of the antenna apparatus 800. In other words, for a given baseline power consumption level of the antenna apparatus 800 in which a certain level of reception performance is attained, the carbon material component 820 when constructed and arranged as set forth herein, significantly increases the reception performance without increasing the baseline power consumption level.

In some embodiments, the carbon material component 820 is encapsulated with an insulation layer to electrically isolate the carbon material component from electrical contact with any other element of the antenna apparatus 800, and to electrically isolate the carbon material component 820 from earth ground.

FIG. 9 illustrates a perspective view of an example of a helical antenna apparatus 900 including electromagnetic absorbing carbon elements 920 according to another embodiment of the present invention. FIG. 9A illustrates a side elevation view of the antenna apparatus 900 of FIG. 9 in the direction of lines 9A-9A. Reference is now made to FIGS. 9, 9A and 9B. The FIG. 9B version has circular base structure rather than square or rectangular in FIG. 9, but the same base in cross-section as shown in FIG. 9A.

The antenna apparatus 900 includes an electrically conductive section 905 having peripheral edges 910. The electrically conductive base section 905 can be made of any suitable metallic or other conductive material. A helical antenna element 915 is mounted on but not coupled to the electrically conductive base section 905 which acts as the antenna ground plane element, and can transmit or receive one or more electromagnetic signals 902 through the air. The electromagnetic signals 902 can take any one of a variety of forms, with any suitable amplitude, frequency, wavelength, and so forth, and can include either analog or digital data. The antenna apparatus 900 includes a carbon material layer component 920 disposed adjacent to the electrically conductive base section 905. The carbon material layer component includes a border region 925 extending beyond the peripheral edges 910 of the electrically conductive base section 905.

The border region 925 of the carbon material layer component extends beyond the peripheral edges 910 of the electrically conductive section by an optimum distance 930 which is $\lambda$ divided by 4 ($\lambda/4$), where $\lambda$ corresponds to the maximum wavelength of the one or more electromagnetic signals 902 capable of being transmitted or received using the antenna element 915. In some embodiments, the distance 930 can correspond to $\lambda/2$, $\lambda$, or $2\lambda$, among other suitable values, greater than $\lambda/4$. It should be understood that while preferably the dimension of distance 930 is λ/4 or thereabout, other values mentioned herein can be used (i.e., nλ/4, where n=1, 2, 4 or 8).

Furthermore, a distance or thickness of dielectric layer 940 between a surface of the carbon material component 920 and the electrically conductive section 905 is less than or equal to λ divided by 4 (λ/4), where λ corresponds to the maximum wavelength of the one or more electromagnetic signals 902 capable of being transmitted or received using the antenna element 915. In some embodiments, the distance of layer 940 can correspond to λ/8, λ/16, or λ/32, among other suitable values, less than λ/4 (i.e., λ/4n where n=1, 2, 4 or 8). It should be understood that while preferably the dimension of layer 940 is λ/4 or thereabout, other values mentioned herein can be used.

More specifically, the electrically conductive section 905 is a substantially planar antenna ground plane 905 having at least a width dimension 945 and a length dimension 950 (Diameter 950 with circumferential edge 905B in FIG. 9B). The antenna element depicted by 915 is a helical coil structure mounted around a central supporting cylindrical rod or beam. The coil may also be embedded into a non electromagnetic absorbing material. These are arranged at a normal relative to the antenna ground plane 905. The carbon material component 920 is substantially planar and arranged parallel to the antenna ground plane 905. The carbon material component 920 includes an optimal width dimension 955 greater than the width dimension 945 of the ground plane by at least a distance of λ divided by 2 (λ/2). The carbon material component 920 includes an optimal length dimension 960 (diameter 960 in FIG. 9B) greater than the length dimension (or diameter) 950 of the ground plane by at least a margin or distance 930 of λ divided by 2 (λ/2).

The carbon material component 920 is structured to reduce background interference or noise 935 of the one or more electromagnetic signals transmitted or received by the antenna element 915. In other words, background interference or noise 935 is reduced so that the one or more electromagnetic signals is more effectively transmitted by the antenna element 915, and/or reception sensitivity of the antenna element 915 is enhanced. In this manner, the integrity and quality of signals transferred between antennas is improved. It should be understood that while the background interference 935 is illustrated in relation to the antenna apparatus 900 arriving from one particular angle or direction, the background interference can arrive from multiple locations and angles, some or all of which can be reduced or eliminated by the carbon material component 920.

In some embodiments, the carbon material component 920 is disposed directly adjacent to and in contact with the electrically conductive ground plane 905. In some embodiments, the carbon material component 920 is adjacent to but not necessarily in contact with the electrically conductive ground plane 905.

The carbon material preferably includes a resin impregnated carbon fiber fabric having a specific resistance of less than or equal to 100 ohms per centimeter squared (100 Ω/cm²) with an optimum value of less than or equal to 1.0Ω/□ along the length of the carbon fibers. The carbon material component 920 is constructed and arranged to increase the effective signal to noise ratio of the antenna apparatus, as disclosed and illustrated herein. For example, the carbon material component 920 can increase the effective signal to noise ratio by a minimum of approximately three decibels. Moreover, the carbon material component 920 increases the reception range of the one or more electromagnetic signals 902 by up to 1.4 times with no additional power consumption of the antenna apparatus 900. In other words, for a given baseline power consumption level of the antenna apparatus 900 in which a certain level of reception performance is attained, the carbon material component 920 when constructed and arranged as set forth herein, significantly increases the reception performance without increasing the baseline power consumption level.

In some embodiments, the carbon material component 920 is encapsulated with an insulation layer to electrically isolate the carbon material component from electrical contact with any other element of the antenna apparatus 900, and to electrically isolate the carbon material component 920 from earth ground.

FIG. 10 illustrates a perspective view of an example of a monopole antenna apparatus 1000 including electromagnetic absorbing carbon elements 1020 according to another embodiment of the present invention. FIG. 10A illustrates a lengthwise sectional view of the antenna apparatus 1000 of FIG. 10 and FIG. 10B is a cross-sectional view at lines 10B-10B. Reference is now made to FIGS. 10, 10A and 10B.

The antenna apparatus 1000 includes an electrically conductive section 1005 having a cylindrical shape with a lower peripheral edge 1010 and an upper edge 1012. The electrically conductive section 1005 can be made of any suitable metallic or other conductive material. A monopole antenna element 1015 is attached to, but not coupled electrically, to the electrically conductive section 1005 which acts as the antenna ground plane element, and can transmit or receive one or more electromagnetic signals 1002 through the air. The electromagnetic signals 1002 can take any one of a variety forms, with any suitable amplitude, frequency, wavelength, and so forth, and can include either analog or digital data. The antenna apparatus 1000 includes a cylindrical carbon material tube 1020 inserted into the interior of the electrically conductive section 1005. The electrically conductive section acting as the ground plane 1005 is separated from the carbon material 1020 by a tubular layer of insulating material 1040 and ring 1040A. A conductive ring 1005A, insulated from the carbon material 1020 by ring 1040A, connects the electrically conductive section 1005 to the outer shield of a connecting signal cable 1050. The carbon material component includes a border region extending beyond the peripheral edges 1010 of the electrically conductive section 1005.

A border region extends to edge 1025 of the cylindrical carbon material component extends beyond the peripheral edge 1010 of the electrically conductive section by an optimum distance 1030 which is λ divided by 4 (λ/4), where λ corresponds to the maximum wavelength of the one or more electromagnetic signals 1002 capable of being transmitted or received using the antenna element 1015. In some embodiments, the distance 1030 can correspond to λ/2, λ, or 2λ, among other suitable values, greater than λ/4. It should be understood that while preferably the dimension of distance (length) 1030 is λ/4 or thereabout, other values mentioned herein can be used (i.e., nλ/4, where n=1, 2, 4 or 8).

Furthermore, a distance defined by a thickness of dielectric or insulating sleeve 1040 between a surface of the carbon material component 1020 and the electrically conductive section 1005 is less than or equal to λ divided by 4 (λ/4), where λ corresponds to the maximum wavelength of the one or more electromagnetic signals 1002 capable of being transmitted or received using the antenna element 1015. In some embodiments, the distance defined by sleeve 1040 can correspond to λ/8, λ/16, or λ/32, among other suitable values, less than λ/4 (i.e., λ/4n, where n=1, 2, 4 or 8). It should be understood that while preferably the dimension of distance (thickness) of 1040 is λ/4 or thereabout, other values mentioned herein can be used.

More specifically, the electrically conductive section 1005 is a substantially cylindrical antenna ground plane 1005 having at least a length dimension 1045. The antenna element 1015 is a conventional monopole antenna with an internally threaded screw-on connector socket (e.g., an SMA connector) for receiving a threaded plug 1008 and unit 1009 of a standard coaxial cable 1050 (e.g., RG-58 cable). The threaded plug 1008 is insulated from the carbon tube 1020 by insulative washer 1040A and is coupled to the copper tube 1005 by a copper washer or grommet 1005A brazed or fitted to the end of tube 1005, so that the carbon fiber tube floats electrically. This coupling enables the ground plane 1005 to couple to the shield of the coaxial cable. These elements are arranged along the same axis relative to the antenna ground plane 1005. The carbon material component 1020 is cylindrical, and when wrapped or coated with insulation 1040, fits inside to the antenna ground plane 1005. The carbon material component 1020 includes an optimal length dimension 1030 greater than the length dimension 1045 of the ground plane by at least a distance of λ divided by 4 (λ/4).

The carbon material component 1020 is structured to reduce background interference or noise of the one or more electromagnetic signals transmitted or received by the antenna element 1015. In other words, background interference or noise is reduced so that the one or more electromagnetic signals is more effectively transmitted by the antenna element 1015, and/or reception sensitivity of the antenna element 1015 is enhanced. In this manner, the integrity and quality of signals transferred between antennas is improved. It should be understood that while the background interference is illustrated in relation to the antenna apparatus 1000 arriving from one particular angle or direction, the background interference can arrive from multiple locations and angles, some or all of which can be reduced or eliminated by the carbon material component 1020.

In some embodiments (e.g., FIG. 11A wherein the carbon fibers are oriented axially and silicone-coated or otherwise individually-insulated), the carbon material component 1020 is disposed directly adjacent to and in contact with the electrically conductive ground plane 1005. In some embodiments (e.g., FIG. 11C), the carbon material component 1020 is adjacent to but not in contact with the electrically conductive ground plane 1005.

The carbon material preferably includes a resin impregnated carbon fiber fabric having a specific resistance of less than or equal to 100 ohms per centimeter squared (100 $\Omega/cm^2$) with an optimum value of less than or equal to $1.0\Omega/\square$ along the carbon fibers which are aligned axially. The carbon material component 1020 is constructed and arranged to increase the effective signal to noise ratio of the antenna apparatus, as disclosed and illustrated herein. For example, the carbon material component 1020 can increase the effective signal to noise ratio by a minimum of approximately three decibels. Moreover, the carbon material component 1020 increases the reception range of the one or more electromagnetic signals 1002 by up to 1.4 times with no additional power consumption of the antenna apparatus 1000. In other words, for a given baseline power consumption level of the antenna apparatus 1000 in which a certain level of reception performance is attained, the carbon material component 1020 when constructed and arranged as set forth herein, significantly increases the reception performance without increasing the baseline power consumption level.

In some embodiments, the carbon material component 1020 is encapsulated with an insulation layer to electrically isolate the carbon material component from electrical contact with any other element of the antenna apparatus 1000, and to electrically isolate the carbon material component 1020 from earth ground. In other embodiments described below, the insulator is integrated into the fabric on the carbon fibers.

Although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Methods for making and using each of the embodiments of the antenna apparatus are also set forth. Using the carbon material component as a supplemental element in antenna design, thereby increasing the transmitted signal to noise ratio, and reducing background electromagnetically induced interference, is contemplated and herein disclosed. The addition of a layer of resin impregnated carbon fiber fabric or other carbon material, located behind the antenna ground plane, or adjacent to the antenna element, diminishes effects of unwanted electromagnetic radiation on signal quality. Much like holding a hand towel behind ones ears helps to reduce the sounds from behind, the carbon material component helps to act as a shielding agent, which absorbs at least a portion of the background noise from becoming introduced into the signal that is transmitted or received. Adding the dampening element can increase the effective signal to noise ratio by 3 decibels or more, which essentially doubles the effective signal field strength, thereby increasing the reception range by up to 1.4 times. This can be accomplished with no additional system power consumption. While some examples of antenna types and configurations are disclosed herein, persons with skill in the art will recognize that the inventive concepts disclosed herein can be implemented with a variety of different antenna types, shapes, and forms.

The carbon fibers of the carbon fiber layer can be treated with silicone to enhance their mechanical and electromagnetic properties. The silicone we have used is Polydimethylsiloxane in the form of MG Chemicals Silicone Conformal Coating 422B. The silicone can be applied by spray, brush, or immersion. The coating of silicone on the carbon fiber acts as an electrical insulating layer. The silicone treated carbon fibers lowers the electrical resistivity of the carbon fibers.

Untreated carbon fibers tend to be hydrophilic. Environmental conditions, e.g. relative humidity and heat, can adversely affect the electromagnetic and mechanical properties of untreated carbon fibers. Untreated carbon fibers are brittle and easily break and fray with handling or mechanical stress.

Silicone treated carbon fibers are hydrophobic. Silicone treated carbon fibers improve the stability of the mechanical, electromagnetic, and thermal properties over a range of environmental conditions.

Silicone treated carbon fibers are supple and bend without breaking under mechanical stress. Silicone treated carbon fibers are easy to mold and do not break if mechanically stressed by sharp radius bends. Depending on the application, different fabric structures and alignments can be used to take advantage of the polarization properties of the carbon fibers. For example, a simple axially-aligned fiber structure is useful in the carbon sleeve of FIG. 10A. For many applications, a standard over-under weave or a twill woven pattern suffices. Multiple aligned, non-woven layers can be laminated in transverse directions. In some situations, such as FIG. 9, a circular or spiral basket weave can be useful.

The carbon fiber layer can be incorporated into quilted fabrics with multiple conductive layers as shown in FIGS. 11A-D. In such quilted fabrics, the conductive layer can be made from a fabric woven with conductive threads. The quilt is layered and stitched together with nonconductive threads. The quilted fabric can also be vacuum formed with epoxy resins to form rigid structural materials.

Figure 11A:
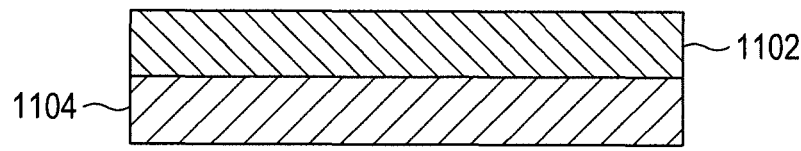
FIG. 11A-D are cross-sectional views of examples of single and multilayer fabrics incorporating a silicone treated carbon fiber layer and conductive layer/fabric (FIGS. 11A and 11B) and an untreated carbon fiber layer (FIGS. 11C and 11D) with a dielectric layer between the carbon fiber layer and the conductive layer/fabric.

Silicone treated carbon fiber can be setup in laminates in which a carbon fiber layer is in direct contact with the metal layer, for example, as shown in FIGS. 11A and 1B. The silicone layer coating on the carbon fibers acts as thin dielectric layer that insulates the carbon fiber layer from the metal layer.

Figure 11B:
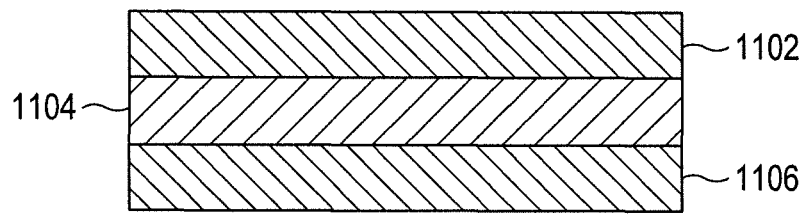
Figure 11C:
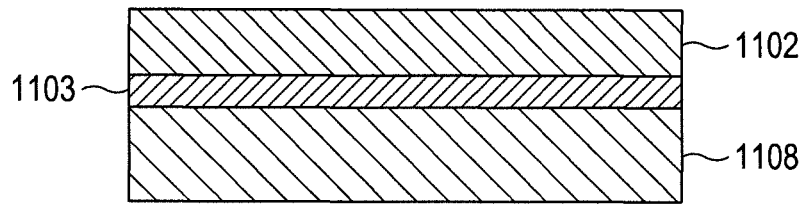
Figure 11D:
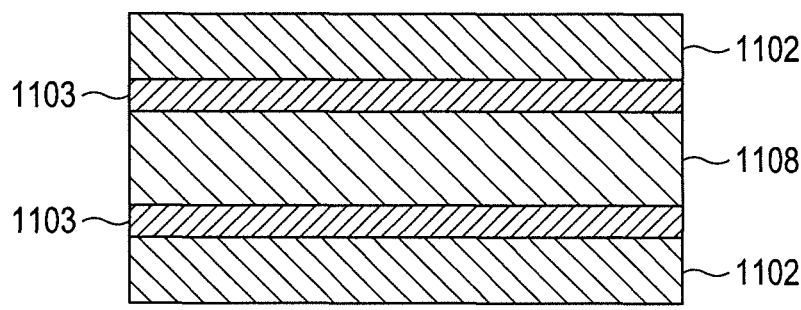

In FIGS. 11A-11D, like layers are denoted by like reference numerals. FIG. 11A shows what can be called a single layer carbon fiber composite which includes a conductive layer/fabric 1102 on a carbon fiber layer 1104. The conductive layer/fabric can be formed of a metallic layer, or a fabric that contains conductive threads, such as copper threads. The carbon fiber layer 1104 is formed by woven, non-woven or aligned carbon fibers that have been treated with a suitable silicone compound that makes the individual fibers insulative, such as polydimethlylsiloxane. FIG. 11B shows a multiple layer version of the structure of FIG. 11A, in which the silicone-treated carbon fiber layer 1104 is sandwiched between two layers of the conductive layer/fabric 1102. FIG. 11C shows a single layer of untreated carbon fiber fabric 1108, similar to layer 1104 but not silicone treated, with a contacting dielectric or insulative layer 1103 separating the carbon fiber fabric 1108 from the conductive layer/fabric 1102 and 1106. FIG. 11D shows a multilayer version of the composite of FIG. 11C in which the untreated carbon fiber fabric 1108 is sandwiched between two layers of dielectric 1103 and conductor 1102.

These composite fabrics are usable in any of the disclosed antennas, but especially in those with nonplanar structures. For example, a single or multiple layer composite is useful in forming the parabolic reflector of FIGS. 2 and 2A. It can also enable the reflector to be foldable like an umbrella.

Consequently, in view of the wide variety of permutations to the embodiments described herein, this detailed description and accompanying material is intended to be illustrative only, and should not be taken as limiting the scope of the invention.

What is claimed is:

1. A carbon fiber fabric with enhanced mechanical and electromagnetic properties comprising:
    a plurality of carbon fibers aligned to form one or more tows of the carbon fibers;
    a coating of silicone on the carbon fibers which electrically insulates the carbon fibers individually;
    the one or more tows of silicone-coated carbon fibers arranged to form a silicone-coated carbon fiber fabric;
    the silicone-coated carbon fiber fabric having a specific sheet resistance of the carbon fibers of less than or equal to 100 ohms per centimeter squared; and
    the carbon fiber fabric is bendable around a radius,
    wherein the silicone-coated carbon fiber fabric attenuates background interference when positioned adjacent to an antenna element.

2. The carbon fiber fabric of claim 1, wherein the silicone-coated carbon fiber fabric is sufficiently bendable to wrap around a cylinder having an outside diameter of about 5.0 mm.

3. The carbon fiber fabric of claim 1, wherein the specific resistivity is equal to or less than 1.0 ohms per centimeter squared along the aligned, silicone-coated carbon fibers.

4. The carbon fiber fabric of claim 1, wherein the silicone-coated carbon fibers are woven, non-woven, basket-woven, or aligned to form the silicone-coated carbon fiber fabric.

5. The carbon fiber fabric of claim 1, wherein the enhanced mechanical properties comprise the ability to bend without breaking.

6. The carbon fiber fabric of claim 1, wherein positioned adjacent to the antenna element includes positioned within one fourth a wavelength ($\lambda/4$) of a maximum wavelength signal communicated via the antenna element.

7. A carbon fiber fabric with enhanced mechanical and electromagnetic properties comprising:
    a plurality of carbon fibers aligned to form one or more tows of the carbon fibers;
    a coating of silicone on the carbon fibers which electrically insulates the carbon fibers individually;
    the one or more tows of silicone-coated carbon fibers are arranged to form a silicone-coated carbon fiber fabric; and
    the silicone-coated carbon fiber fabric having sufficient resistivity of the aligned silicone-coated carbon fibers to attenuate background interference when positioned adjacent to an antenna element.

8. The carbon fiber fabric of claim 7, wherein the silicone-coated carbon fiber fabric is incorporated into a quilted fabric.

9. The carbon fiber fabric of claim 8, wherein the quilted fabric comprises the silicone-coated carbon fiber fabric with at least one conductive layer.

10. The carbon fiber fabric of claim 8, wherein the conductive layer is comprised of a metallic layer.

11. The carbon fiber fabric of claim 8, wherein the conductive layer is comprised of a fabric containing conductive threads.

12. The carbon fiber fabric of claim 7, wherein the silicone-coated carbon fiber fabric is arranged in a laminate with at least one metal layer.

13. The carbon fiber fabric of claim 7, wherein the silicone-coated carbon fiber fabric is between at least two layers of conductive fabric.

14. The carbon fiber fabric of claim 7, wherein positioned adjacent to the antenna element includes positioned within one fourth a wavelength ($\lambda/4$) of a maximum wavelength signal communicated via the antenna element.

* * * * *